(12) United States Patent
Gibbens et al.

(10) Patent No.: US 9,292,416 B2
(45) Date of Patent: Mar. 22, 2016

(54) SOFTWARE DEVELOPMENT KIT TESTING

(71) Applicant: VMware, Inc., Palo Alto, CA (US)

(72) Inventors: David Gibbens, Blaine, MN (US);
Nicholas Krueger, Somerset, WI (US);
Sean McDonald, St. Paul, MN (US);
Scott Rens, Shoreview, MN (US);
Travis Dow, Plymouth, MN (US)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 13/650,555

(22) Filed: Oct. 12, 2012

(65) Prior Publication Data

US 2014/0109057 A1 Apr. 17, 2014

(51) Int. Cl.
*G06F 9/45* (2006.01)
*G06F 11/36* (2006.01)

(52) U.S. Cl.
CPC .................... *G06F 11/3664* (2013.01)

(58) Field of Classification Search
None
See application file for complete search history.

(56) References Cited

U.S. PATENT DOCUMENTS

| | | |
|---|---|---|
| 5,701,137 A | 12/1997 | Kiernan et al. |
| 5,748,963 A | 5/1998 | Orr |
| 5,854,927 A | 12/1998 | Gelissen |
| 6,085,244 A | 7/2000 | Wookey |
| 6,195,694 B1 | 2/2001 | Chen et al. |
| 6,301,336 B1 | 10/2001 | Branton et al. |
| 6,301,701 B1 | 10/2001 | Walker et al. |
| 6,907,546 B1 | 6/2005 | Haswell et al. |
| 7,076,713 B1 | 7/2006 | Hess |
| 7,080,358 B2 | 7/2006 | Kuzmin |
| 7,216,338 B2 | 5/2007 | Barnett et al. |
| 7,421,681 B2 | 9/2008 | DeWitt, Jr. et al. |
| 7,496,903 B2 | 2/2009 | Rees et al. |
| 7,707,139 B2 | 4/2010 | Okamoto et al. |
| 7,769,974 B2 | 8/2010 | Bhansali et al. |
| 7,836,346 B1 | 11/2010 | Davidov et al. |
| 8,176,480 B1 | 5/2012 | Spertus |
| 8,261,243 B2 | 9/2012 | Chinchalkar et al. |
| 8,281,187 B1 | 10/2012 | Desai et al. |
| 8,332,827 B2 | 12/2012 | Eddé et al. |
| 8,359,582 B2 | 1/2013 | Elliott |
| 8,402,131 B2 | 3/2013 | Bansal et al. |
| 8,478,948 B2 | 7/2013 | Panchenko et al. |
| 8,499,299 B1 | 7/2013 | Jakab et al. |
| 8,527,262 B2 | 9/2013 | Kambhatla et al. |
| 8,533,687 B1 | 9/2013 | Greifeneder et al. |
| 8,566,559 B2 | 10/2013 | Schmich et al. |
| 8,572,570 B2 | 10/2013 | Grechanik et al. |
| 8,578,266 B2 | 11/2013 | Davison |
| 8,578,339 B2 | 11/2013 | Day et al. |
| 8,595,701 B2 | 11/2013 | Li et al. |
| 8,601,445 B2 | 12/2013 | Broman et al. |
| 8,621,301 B2 | 12/2013 | Goyal et al. |
| 8,627,290 B2 * | 1/2014 | Clee et al. .................. 717/125 |
| 8,739,126 B2 | 5/2014 | Glaser |

(Continued)

OTHER PUBLICATIONS

End-To-End Virtual Procedures Test Script, Jan. 5, 2011, 7 pages, [Retrieved on Mar. 8, 2014], Retrieved from the internet: <URL:https://issues.jboss.org/secure/attachment/12361910/E2eVirtualProceduresTestScript_Teiid7.pdf>.

(Continued)

*Primary Examiner* — Chuck Kendall

(57) ABSTRACT

In a method of software development kit (SDK) testing, a graphical user interface is provided for initializing a test of an SDK. An application is created to run against the SDK. The output of the SDK is verified.

22 Claims, 36 Drawing Sheets

(56) References Cited

U.S. PATENT DOCUMENTS

| | | |
|---|---|---|
| 8,799,877 B2 | 8/2014 | Cheriton |
| 8,839,035 B1 | 9/2014 | Dimitrovich et al. |
| 8,938,683 B2 | 1/2015 | Bentrup |
| 2002/0040470 A1 | 4/2002 | Guthrie et al. |
| 2002/0065814 A1 | 5/2002 | Okamoto et al. |
| 2002/0091995 A1 | 7/2002 | Arnold et al. |
| 2002/0108102 A1 | 8/2002 | Muhlestein et al. |
| 2002/0138226 A1 | 9/2002 | Doane |
| 2003/0131337 A1 | 7/2003 | Perumainar |
| 2003/0159132 A1 | 8/2003 | Barnett et al. |
| 2004/0056894 A1 | 3/2004 | Zaika et al. |
| 2004/0107415 A1 | 6/2004 | Melamed et al. |
| 2004/0163077 A1 | 8/2004 | Dimpsey et al. |
| 2005/0071818 A1 | 3/2005 | Reissman et al. |
| 2006/0218533 A1 | 9/2006 | Koduru et al. |
| 2007/0022407 A1 | 1/2007 | Givoni |
| 2007/0226697 A1 | 9/2007 | Barsness et al. |
| 2007/0226698 A1 | 9/2007 | Cascaval et al. |
| 2008/0141221 A1 | 6/2008 | Benesovska et al. |
| 2009/0193173 A1 | 7/2009 | Joshi et al. |
| 2010/0146420 A1 | 6/2010 | Bharadwaj et al. |
| 2010/0251218 A1 | 9/2010 | Mahesh et al. |
| 2011/0010691 A1 | 1/2011 | Lu et al. |
| 2011/0023019 A1 | 1/2011 | Aniszczyk et al. |
| 2011/0185232 A1 | 7/2011 | Soundararajan |
| 2011/0197097 A1 | 8/2011 | Beaty et al. |
| 2011/0209121 A1 | 8/2011 | Nagata et al. |
| 2012/0042210 A1 | 2/2012 | Glaser et al. |
| 2012/0054551 A1 | 3/2012 | Gao et al. |
| 2012/0159444 A1 | 6/2012 | Agarwal et al. |
| 2012/0204154 A1 | 8/2012 | Li et al. |
| 2012/0233597 A1 | 9/2012 | Ogasawara |
| 2012/0331113 A1 | 12/2012 | Jain et al. |
| 2013/0036404 A1 | 2/2013 | Shu et al. |
| 2013/0097586 A1 | 4/2013 | Chandra et al. |
| 2013/0104106 A1 | 4/2013 | Brown et al. |
| 2013/0132774 A1 | 5/2013 | Somendra |
| 2013/0152047 A1 | 6/2013 | Moorthi et al. |
| 2013/0173962 A1 | 7/2013 | Li et al. |
| 2013/0173963 A1 | 7/2013 | Gorman et al. |
| 2013/0174117 A1 | 7/2013 | Watters et al. |
| 2013/0262931 A1 | 10/2013 | Siddalingesh |
| 2013/0318503 A1 | 11/2013 | Li et al. |
| 2013/0338995 A1 | 12/2013 | Elkins et al. |
| 2014/0052768 A1 | 2/2014 | Deng et al. |
| 2014/0075344 A1 | 3/2014 | Bentrup |

OTHER PUBLICATIONS

Squish 4.0 User Manual, froglogic, 2011, 69 pages, [Retrieved on Mar. 5, 2014], Retrieved from the internet: <URL:https://web.archive.org/web/20111126025650/http://doc.froglogic.com/squish/4.0/all/tut-qt-creating-a-test-suite.html>.

Bai, et al., Cloud Testing Tools, 2011, IEEE pp. 1-12; <http://ieeexplore.ieee.org/stamp/stamp.jsp?tp=&arnumber=6139087>.

Banzai, et al., D-Cloud: Design of a Software Testing Environment for Reliable Distributed Systems Using Cloud Computing Technology, 2010, IEEE, pp. 631-636; <http://ieeexplore.ieee.org/stamp/stamp.jsp?tp=&arnumber=593414>.

Duro, et al., Open Virtualization Framework for Testing Ground Systems, 2010 ACM, PADTAD'10, Jul. 13, Trento, Italy, pp. 67-73; <http://dl.acm.org/results.cfm?h=1&cfid=305675875&cftoken=41809730>.

Gambi, et al., Iterative Test Suites Refinement for Elastic Computing Systems, 2013 ACM, ESEC/FSE'13, Aug. 18-26, 2013, Saint Petersburg, Russia, pp. 635-638; <http://dl.acm.org/ . . . cfid=304794976&cftoken=79323359>.

Paulino, et al., SmART: An Application Reconfiguration Framework, 2010 Springer Berlin Heidelberg, pp. 73-84; <http://link.springer.com/chapter/10.1007%2F978-3-642-15654-0_5>.

Pohjolainen, et al., Software Testing Tools, Mar. 2002, University of Kuopio, pp. 1-79; <www.cs.uef.fi/ . . . /SoftwareTestingTools.pdf>.

Wu, et al., The Study on an Intelligent General-Purpose Automated Software Testing Suite, 2010 IEEE, pp. 993-996; <http://ieeexplore.ieee.org/stamp/stamp.jsp?tp=&arnumber=5523591>.

Orion 0.4 M1—New and Noteworthy, Orion News, Feb. 3, 2012, 8 pages [retrieved on Dec. 15, 2015], Retrieved from the Internet: <URL:https://web.archive.org/web/20120203232449/http://planetorion.org/news/2011/12/orion-0-4-m1-new-and-noteworthy>.

\* cited by examiner

500

```
┌─────────────────────────────────────────────────────┐
│ PRESENT A USER INTERFACE FOR ENTRY OF LINES OF A    │
│ CUSTOM ACTION.                                      │
│ 510                                                 │
└─────────────────────────────────────────────────────┘
                          │
                          ▼
┌─────────────────────────────────────────────────────┐
│ RESPONSIVE TO RECEIPT OF A SUB-PORTION OF A LINE OF │
│ THE CUSTOM ACTION VIA THE USER INTERFACE,           │
│ AUTOMATICALLY CHECK THE SUB-PORTION FOR ERRORS IN   │
│ SYNTAX AS WELL AS FOR AUTOCOMPLETION                │
│ RECOMMENDATIONS.                                    │
│ 511                                                 │
└─────────────────────────────────────────────────────┘
```

VALIDATE EXECUTION OF THE LINE OF THE CUSTOM ACTION.
512

STORE THE CUSTOM ACTION AS A SELECTABLE CUSTOM ACTION IN A DYNAMIC LAYER OF A TESTING INFRASTRUCTURE WHICH IS ASSOCIATED WITH A PARTICULAR INSTANCE OF A SOFTWARE ITEM.
513

INITIATE AN AUTOMATED TEST OF A SOFTWARE ITEM USING A TEST OF A TESTING FRAMEWORK.
710

PAUSE THE TEST WITHIN A COMPUTING ENVIRONMENT IN WHICH THE TEST IS BEING CONDUCTED IN RESPONSE TO OCCURRENCE OF AN ERROR CONDITION DURING THE TEST.
720

ACCEPT AN ALTERATION TO THE TEST WHILE THE TEST IS PAUSED.
730

CONTINUE THE TEST USING THE ALTERED TEST.
740

```
┌─────────────────────────────────────────────────────────────┐
│ PAUSE A TEST WITHIN A COMPUTING ENVIRONMENT IN WHICH THE    │
│ TEST IS BEING CONDUCTED IN RESPONSE TO OCCURRENCE OF AN     │
│ ERROR CONDITION DURING AN AUTOMATED TEST OF A SOFTWARE      │
│                           ITEM.                             │
│                            810                              │
└─────────────────────────────────────────────────────────────┘
                              │
                              ▼
┌─────────────────────────────────────────────────────────────┐
│    PRESENT A PLURALITY OF USER SELECTABLE OPTIONS WITH      │
│                 RESPECT TO THE PAUSED TEST.                 │
│                            820                              │
└─────────────────────────────────────────────────────────────┘
                              │
                              ▼
┌─────────────────────────────────────────────────────────────┐
│  IMPLEMENT AN ACTION WITH RESPECT TO THE PAUSED TEST IN     │
│    RESPONSE TO RECEIPT OF A SELECTION OF ONE OF THE         │
│         PLURALITY OF USER SELECTABLE OPTIONS.               │
│                            830                              │
└─────────────────────────────────────────────────────────────┘
```

```
┌─────────────────────────────────────────────────────────────┐
│ PRESENT A GRAPHICAL USER INTERFACE FOR SCHEDULING A TEST    │
│                   OF A SOFTWARE ITEM.                       │
│                          1110                               │
└─────────────────────────────────────────────────────────────┘
                              │
                              ▼
┌─────────────────────────────────────────────────────────────┐
│ RECEIVE, VIA THE GRAPHICAL USER INTERFACE, SPECIFIED        │
│ INFORMATION REGARDING CONDUCT OF A TEST INCLUDING A TEST    │
│           TIME FOR INITIATING THE TEST.                     │
│                          1120                               │
└─────────────────────────────────────────────────────────────┘
                              │
                              ▼
┌─────────────────────────────────────────────────────────────┐
│               INITIATE THE TEST AT THE TEST TIME.           │
│                          1130                               │
└─────────────────────────────────────────────────────────────┘
```

- IN RESPONSE TO COMPLETION OF THE TEST, SEND RESULTS OF THE TEST TO A SPECIFIED NOTIFICATION LOCATION.
  1140

- IN RESPONSE TO AN ERROR CONDITION OCCURRING DURING THE TEST, SEND A REPORT OF THE ERROR CONDITION TO A SPECIFIED ELECTRONIC NOTIFICATION LOCATION.
  1150

- MAINTAIN THE TEST IN AN ACTIVE WITHOUT TERMINATING THE TEST.
  1160

┌─────────────────────────────────────────────────────────┐
│ INITIATE AN AUTOMATED TEST OF A SOFTWARE ITEM AT A      │
│                  PRESCHEDULED TIME.                      │
│                         1210                             │
└─────────────────────────────────────────────────────────┘
                              ↓
┌─────────────────────────────────────────────────────────┐
│ IN RESPONSE TO OCCURRENCE OF AN ERROR CONDITION DURING  │
│     THE TEST, PAUSING THE TEST WITHIN A COMPUTING       │
│    ENVIRONMENT IN WHICH THE TEST IS BEING CONDUCTED.    │
│                         1220                             │
└─────────────────────────────────────────────────────────┘
                              ↓
┌─────────────────────────────────────────────────────────┐
│  IN RESPONSE TO COMPLETION OF THE TEST, SEND RESULTS OF │
│ THE TEST TO A SPECIFIED ELECTRONIC NOTIFICATION LOCATION.│
│                         1230                             │
└─────────────────────────────────────────────────────────┘

```
CONDUCT AN AUTOMATED TEST OF A SOFTWARE ITEM.
1310
              │
              ▼
RESPONSIVE TO OCCURRENCE OF AN ERROR CONDITION DURING
THE TEST, CAPTURE TEST DATA ASSOCIATED WITH THE ERROR
CONDITION.
1320
              │
              ▼
FORWARD A PORTION OF THE CAPTURED TEST DATA TO A
DESIGNATED ELECTRONIC NOTIFICATION LOCATION.
1330
```

```
CONDUCT AN AUTOMATED TEST OF A SOFTWARE ITEM WITHIN A
COMPUTING ENVIRONMENT.
1410
```

↓

```
RESPONSIVE TO OCCURRENCE OF AN ERROR CONDITION DURING
THE TEST, AUTOMATICALLY CAPTURE DOCUMENTATION OF AN
EXECUTION STATE ASSOCIATED WITH THE SOFTWARE ITEM AT A
TIME OF OCCURRENCE OF THE ERROR CONDITION.
1420
```

↓

```
ELECTRONICALLY FORWARD THE CAPTURED DOCUMENTATION OF
THE EXECUTION STATE ASSOCIATED WITH THE SOFTWARE ITEM TO
A DESIGNATED ELECTRONIC NOTIFICATION LOCATION.
1430
```

```
CONDUCT AN AUTOMATED TEST OF A SOFTWARE ITEM WITHIN A
COMPUTING ENVIRONMENT.
1510
```

```
RESPONSIVE TO OCCURRENCE OF AN ERROR CONDITION DURING
THE TEST
1520

AUTOMATICALLY ANNOTATE A DESCRIPTION OF THE
    ERROR CONDITION INTO A TEST LOG OF ACTIONS
    PERFORMED DURING THE TEST TO CREATE AN
    ANNOTATED TEST LOG
    1522

AUTOMATICALLY CAPTURE DOCUMENTATION OF AN
    EXECUTION STATE ASSOCIATED WITH THE SOFTWARE
    ITEM AT A TIME OF OCCURRENCE OF THE ERROR
    CONDITION
    1524

EMBED A HYPERLINK TO THE CAPTURED
    DOCUMENTATION WITHIN THE ANNOTATED TEST LOG.
    1526
```

```
ELECTRONICALLY FORWARD THE ANNOTATED TEST LOG TO A
DESIGNATED ELECTRONIC NOTIFICATION LOCATION.
1530
```

```
┌─────────────────────────────────────────────────────────┐
│  PRESENT A GRAPHICAL USER INTERFACE FOR INITIALIZING A  │
│        TEST OF A SOFTWARE DEVELOPMENT KIT (SDK).        │
│                          1710                           │
└─────────────────────────────────────────────────────────┘
                              ↓
┌─────────────────────────────────────────────────────────┐
│         CREATE AN APPLICATION TO RUN AGAINST THE SDK.   │
│                          1720                           │
│  ┌───────────────────────────────────────────────────┐  │
│  │    BIND NATURAL LANGUAGE TO AN APPLICATION        │  │
│  │       PROGRAMMING INTERFACE INTERCEPT.            │  │
│  │                      1725                         │  │
│  └───────────────────────────────────────────────────┘  │
└─────────────────────────────────────────────────────────┘
                              ↓
┌─────────────────────────────────────────────────────────┐
│                VERIFY AN OUTPUT OF THE SDK.             │
│                          1730                           │
└─────────────────────────────────────────────────────────┘
     │
     │    ┌───────────────────────────────────────────┐
     ├──▶ │      INVOKE EACH ENTRY POINT INTO AN SDK. │
     │    │                   1740                    │
     │    └───────────────────────────────────────────┘
     │
     │    ┌───────────────────────────────────────────┐
     ├──▶ │         TEST INTERACTIONS WITH THE SDK.   │
     │    │                   1760                    │
     │    └───────────────────────────────────────────┘
     │
     │    ┌───────────────────────────────────────────┐
     └──▶ │ TEST CALLBACKS FROM THE SDK BACK TO ENTRY │
          │            POINTS IN AN APPLICATION.      │
          │                   1770                    │
          └───────────────────────────────────────────┘
```

```
INITIALIZE A TEST WHICH MANAGES A TESTING ENVIRONMENT
THAT THE TEST EXECUTES TEST CASES AGAINST DURING RUN
TIME.
2010
          │
          ▼
ACCESS AT LEAST ONE GLOBAL VARIABLE FILE.
2020
```

REVERT VIRTUAL MACHINE SNAPSHOTS.
2030

START AT LEAST ONE VIRTUAL MACHINE.
2040

STOP AT LEAST ONE VIRTUAL MACHINE.
2050

```
RECEIVE A PORTION OF A LINE OF A TEST CASE FOR A SOFTWARE
ITEM.
2110
          │
          ▼
VALIDATE SYNTAX UPON ENTRY OF THE PORTION OF THE LINE.
2120
          │
          ▼
EXECUTE THE LINE AFTER THE SYNTAX VALIDATION.
2130
          │
          ▼
INDICATE ANY ERROR BASED ON EXECUTION.
2140
          │
          ▼
INDICATE ANY ERROR THAT OCCURS WHILE EXECUTING THE LINE.
2150
```

RECEIVE A USER INPUT OF A PLAIN ENGLISH CONTROL NAME INTO A TEST FILE.
2310

AUTOMATICALLY SEARCH A USER INTERFACE UNDER TEST FOR A CONTROL CORRESPONDING TO THE PLAIN ENGLISH CONTROL NAME.
2320

DYNAMICALLY BIND A CONTROL IN THE SOFTWARE ITEM UNDER TEST TO THE PLAIN ENGLISH CONTROL NAME.
2330

FIG. 23

SOFTWARE DEVELOPMENT KIT TESTING

CROSS REFERENCE TO RELATED U.S. APPLICATIONS

This Application is related to U.S. patent application Ser. No. 13/650,386, by David Gibbens et al., filed on Oct. 12, 2012, entitled "SOFTWARE TEST AUTOMATION," and assigned to the assignee of the present application; to the extent not repeated herein, the contents of this related patent application are hereby incorporated herein by reference.

This Application is related to U.S. patent application Ser. No. 13/650,415, by David Gibbens, filed on Oct. 12, 2012, entitled "ALTERING A TEST," and assigned to the assignee of the present application; to the extent not repeated herein, the contents of this related patent application are hereby incorporated herein by reference.

This Application is related to U.S. patent application Ser. No. 13/650,455, by Callistus Clark Schissel et al., filed on Oct. 12, 2012, entitled "SCHEDULED SOFTWARE ITEM TESTING," and assigned to the assignee of the present application; to the extent not repeated herein, the contents of this related patent application are hereby incorporated herein by reference.

This Application is related to U.S. patent application Ser. No. 13/650,608, by Sean McDonald et al., filed on Oct. 12, 2012, entitled "CLOUD-BASED SOFTWARE TESTING," and assigned to the assignee of the present application; to the extent not repeated herein, the contents of this related patent application are hereby incorporated herein by reference.

This Application is related to U.S. patent application Ser. No. 13/650,746, by David Gibbens et al., filed on Oct. 12, 2012, entitled "TEST CREATION WITH EXECUTION," and assigned to the assignee of the present application; to the extent not repeated herein, the contents of this related patent application are hereby incorporated herein by reference.

This Application is related to U.S. patent application Ser. No. 13/650,860, by Callistus Clark Schissel et al., filed on Oct. 12, 2012, entitled "CAPTURING TEST DATA ASSOCIATED WITH ERROR CONDITIONS IN SOFTWARE ITEM TESTING," and assigned to the assignee of the present application; to the extent not repeated herein, the contents of this related patent application are hereby incorporated herein by reference.

This application is related to U.S. patent application Ser. No. 13/650,969, by Mark Tempel et al., filed on Oct. 12, 2012, entitled "TEST ENVIRONMENT MANAGED WITHIN TESTS," and assigned to the assignee of the present application; to the extent not repeated herein, the contents of this related patent application are hereby incorporated herein by reference.

This Application is related to U.S. patent application Ser. No. 13/651,026, by Mark Tempel et al., filed on Oct. 12, 2012, entitled "TEST LANGUAGE INTERPRETER," and assigned to the assignee of the present application; to the extent not repeated herein, the contents of this related patent application are hereby incorporated herein by reference.

BACKGROUND

Testing often consumes a considerable amount of time when developing software. Typically, a programming background is required to create automated tests for software applications, application programming interfaces, software development kits, web services and websites. Most test applications require users to learn a specific language to write tests. In addition, when a new instance (build, version, etc.) of a product is developed, new or modified tests may be required to ensure that the new instance of the product performs correctly.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 5A and 5B illustrate a flow diagram of a method implemented by a system for creating a custom action, in accordance with various embodiments.

FIG. 7 illustrates a flow diagram of a method of software item testing, in accordance with various embodiments.

FIG. 8 illustrates a flow diagram of a method of software item testing, in accordance with various embodiments.

FIG. 11 illustrates a flow diagram of a method of software item testing, in accordance with various embodiments.

FIG. 12 illustrates a flow diagram of a method of software item testing, in accordance with various embodiments.

FIG. 13 illustrates a flow diagram of a method of software item testing, in accordance with various embodiments.

FIG. 14 illustrates a flow diagram of a method of software item testing, in accordance with various embodiments.

FIG. 15 illustrates a flow diagram of a method of software item testing, in accordance with various embodiments.

FIG. 17 is a flow diagram of a method of software development kit testing, in accordance with various embodiments.

FIG. 20 is a flow diagram of a method of managing a test environment, in accordance with various embodiments.

FIG. 21 is a flow diagram of a method of executing a test while creating the test, in accordance with various embodiments.

FIG. 23 is a flow diagram of a method of binding a software item to a plain English name, in accordance with various embodiments.

DESCRIPTION OF EMBODIMENTS

Figure 1:
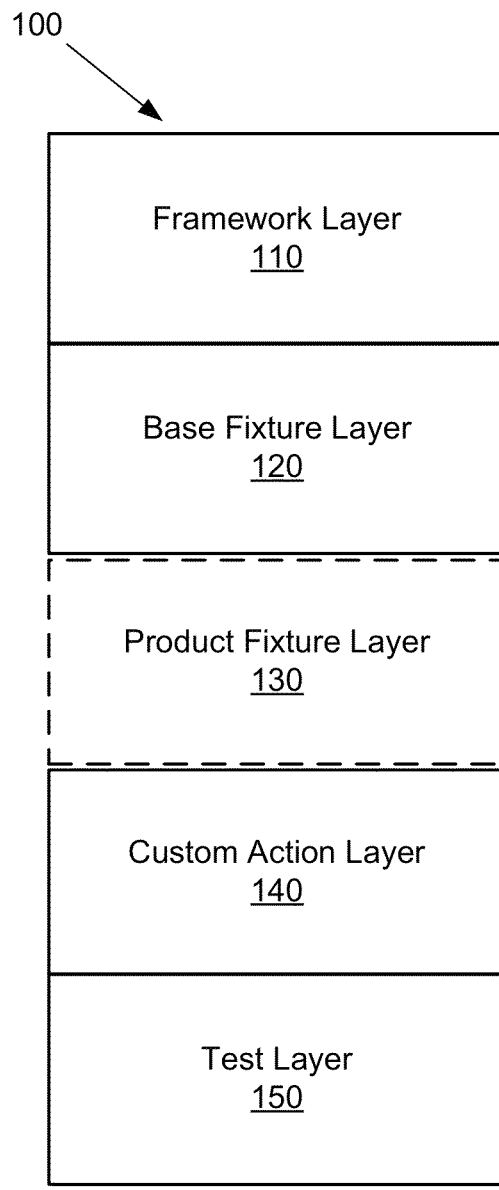
FIG. 1 is a block diagram of an example testing framework, in accordance with various embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accepting," "accessing," "annotating," "binding," "capturing," "checking," "conducting," "continuing," "creating," "determining," "embedding," "executing," "forwarding," "implementing," "indicating," "initiating," "invoking," "maintaining," "pausing," "presenting," "receiving," "referencing," "resuming," "retrying," "reverting," "searching," "starting," "stopping," "storing," "terminating," "testing," "traversing," "validating," "verifying," or the like, often refer to the actions and processes of an electronic computing device or system, such as a virtual machine, among others, of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Herein various systems, methods and techniques for providing a test framework are described. As discussed herein, the testing framework is flexible such that tests may be performed on various software items at various levels (e.g., a user interface (UI), a web-browser interface, an application programming interface (API), etc.) and perform various operations (e.g., test for conformity, test for bugs, test operational reliability, requirement testing, performance testing, etc.).

A framework for integrated test (FIT) is a tool used to create automated tests. Conventionally, a FIT can be thought of as a stack with a static framework layer, upon which a dynamic (i.e., customizable) fixture layer sits, upon which static test layer sits. With a conventional FIT, programmers write tests for the fixture layer and the fixture layer gathers data from HTML files to perform actions. In the conventional FIT, the fixture layer is tied to a specific instance of a software item (version, build within a version, or the like) and often requires changing whenever a product revision takes place or a new build of an existing version of a software item is produced. This programming aspect is a deterrent from adopting a new testing framework, such as a conventional FIT, as the time required to learn a custom programming language (and its syntax) in order to program or alter fixture layers of a conventional FIT can be considerable. Due to the custom programming requirements, many testers hire professional programmers to write tests for the fixture layer of a FIT for a particular software item under test. This can be costly. The amount of custom programming and associated cost and time can also be a deterrent to change between instances (builds and versions) of software items, as more changes typically equate to a greater re-write time for the dynamic fixture layer used to test the changes.

FIG. 1 is a block diagram of an example new testing framework 100, in accordance with various embodiments. Testing framework 100 differs from a conventional FIT. Testing framework 100 comprises layers that are substantially persistent, as well as at least one layer that is dynamic. For example, testing framework 100 includes a framework layer 110 which is substantially persistent (also referred to as substantially static). Layers that are substantially persistent are compiled prior to the custom action layer being run. Thus, substantially persistent layers are less changeable than the custom action layer 140 because they have already been compiled. Testing framework 100 further comprises a base fixture layer 120 which is substantially persistent, a product fixture layer 130 which is substantially persistent, a custom action layer which is dynamic (i.e., changeable), and a test layer 150 which is substantially persistent after being written. It should be noted that product fixture layer 130 is not required to be included, and may not be included in embodiments described herein. In some embodiments, custom action layer 140 interfaces between product fixture layer 130 (when included) and test layer 150. In embodiments where fixture layer 130 is not included, custom action layer 140 interfaces between base fixture layer 120 and test layer 150. As will be further described herein, custom action layer 140 can built and/or modified via entry of parameters into fields of a user interface (e.g., 212 (of FIGS. 2A and 2B)). The parameters are typically expressed as natural language words, or as strings of such natural language words. This allows a user to easily create and modify customized actions in a commonly used language with easy to understand syntax and eliminates the need to learn a special purpose language simply for programming a fixture layer as would be required in a conventional FIT. Typically, customized actions 320 (shown in FIG. 4A) of custom action layer 140 are built/modified for actions which are frequently used in tests of test layer 150 (thus automating and/or accelerating the creation of those test items) and/or for actions which are expected to change as software changes. Embodiments, as described herein, are not obvious over conventional FITs because they require an extensive and burdensome alteration to the conventional manner that a FIT is structured, and such a change is not an easy, quick, intuitive, or low cost undertaking. In embodiments described herein, the natural language created as part of the test case editor (e.g., custom testing agent GUI 410 of FIG. 4A) is utilized to create the additional software layers of the custom actions 320 as opposed to extending existing code (e.g., modifying an existing layer). In other words, one product fixture layer 130 may be added to the conventional FIT model for actions that change infrequently, and a custom action layer 140 is provided to add and modify custom actions 320 that are frequently referenced. By adding a layer of abstraction (i.e., custom action layer 140) to fixture layers (120, 130) tests can have additional capabilities and the persons creating tests do not have to re-compile code every time a change is made to the tests.

With continued reference to FIG. 1, custom action layer 140 can be used to create custom actions 320 that can then be called by tests in test layer 150. This allows test layer 150 to remain static or relatively static from version to version and build to build of a software item, with changes being handled through revisions to the custom actions of custom action layer 140. This also allows data formats to be basic and consistent across all test types for a variety of software items and different instances (e.g., version(s) or build(s) within a version) of those software items. Thus, testing framework 100, as described herein, allows a user to write a test for test layer 150 and a product fixture layer 130 once, and then easily change custom action enabled test cases within custom action layer 140 when an instance of a software item under test 213 (of FIGS. 2A and 2B) changes.

Example Computing Environments

Figure 2A:
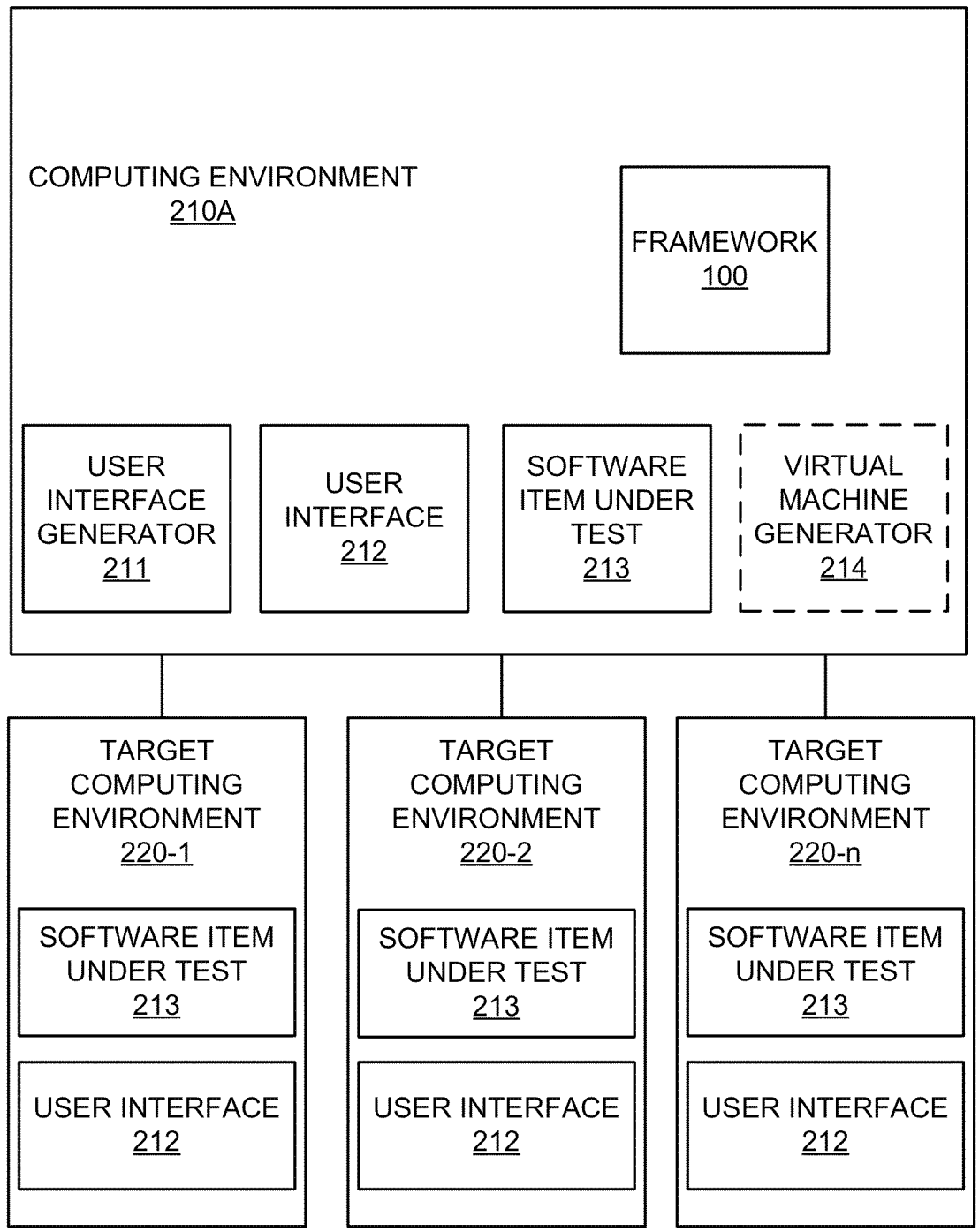
FIGS. 2A and 2B are block diagrams of some example computing environments with which or upon which embodiments may be implemented.
Figure 2B:
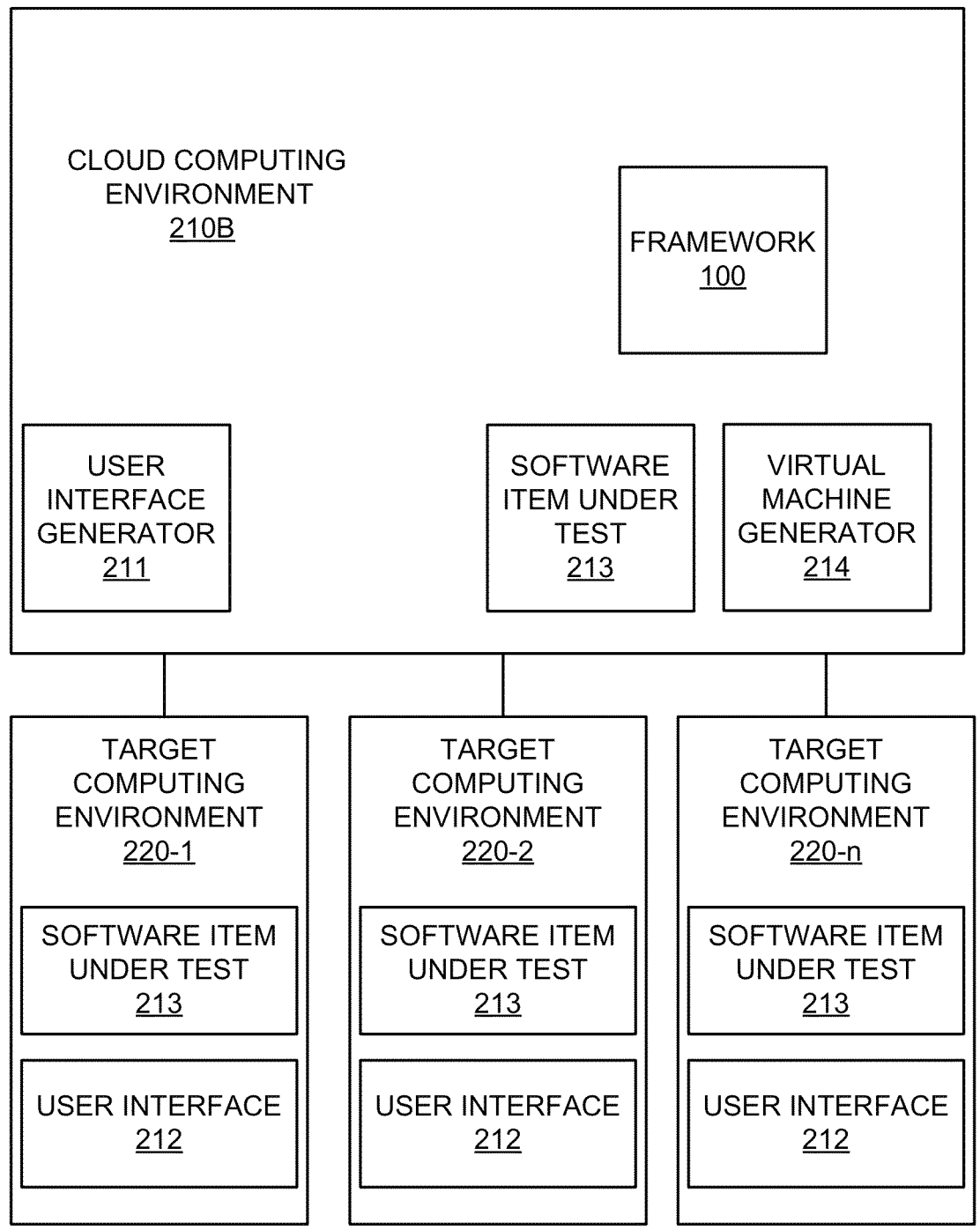

FIGS. 2A and 2B show example computing environments with which or upon which embodiments of framework 100 may be implemented. As used herein, "a computing environment" comprises one or some combination of communicatively coupled computing systems. FIG. 2A shows an example computing environment 210A where testing may be performed locally. In an embodiment, a target computing environment 220 (e.g., 220-1, 220-2, 220-n) may be accessed by computing environment 210A. Moreover, a target computing environment 220 may be used to access computing environment 210A. Embodiments of example computing environment 210A are scalable, and target computing environments 220 may be added and removed from computing environment 210A. Target computer environments 220 each comprise user interfaces 212 and the software items under test 213.

In an embodiment, computing environment 210A comprises framework 100, user interface generator 211, user interface 212, and software item under test 213. In some embodiments, computing environment 210A further includes a virtual machine generator 214. Although not depicted, it should be appreciated that computing environment 210A includes one or more processors and storage (e.g., memory, disk storage, etc.).

Framework 100, as discussed herein, is operable to test a software item under test 213 and comprises various layers including a custom action layer 140. User interface generator 211 may create a user interface 212 for a remote or local user. In other words, user interface generator 211 pushes a user interface 212 to a user running a test on the local computing environment 210A, or a target computing environment 220. It should be understood by those skilled in the art that a target computing environment 220 may be a real or virtual machine, a server, a personal computer, or any other type of computing environment.

A local user of computing environment 210A may utilize user interface 212 to run tests on a software item under test 213. Software item under test 213 may comprise software local to computing environment 210A or software on a target computing environment 220. Computing environment 210A may import some or all of the software item under test 213 from a target computing environment 220. Lastly, virtual machine generator 214, when included, is operable to create a specified virtual machine platform in computing environment 210A or a target computing environment 220, on which a software item may be tested.

FIG. 2B shows a cloud computing environment 210B. In an embodiment, framework 100 is hosted in a cloud computing environment 210B. Cloud computing environment 210B comprises many of the same features of computing environment 210A. For example, cloud computing environment 210B is also coupled to target computing environments 220 (e.g., via an intranet, the Internet, or other communicative coupling), and cloud computing environment 210B comprises a user interface generator 211, software item under test 213, and a virtual machine generator 214. Although not depicted, it should be appreciated that computing environment 210B includes one or more processors and storage (e.g., memory, disk storage, etc.).

Cloud-based computing environment 210B can be utilized in the same manner as computing environment 210A. In other words, computing environment 210B can be accessed remotely from a target computing environment 220 to create/modify portions of framework 100 located within computing environment 210B or on a target computing environment 220 (which may be local or remote from a user). In an embodiment, a user can remotely perform all testing in a cloud computing environment 210B. It should be appreciated that access and configuration of one or more resources of cloud-based computing environment 210B may be provisioned in response to payment of a fee by a user and/or as a fee based service.

Libraries

Figure 3:
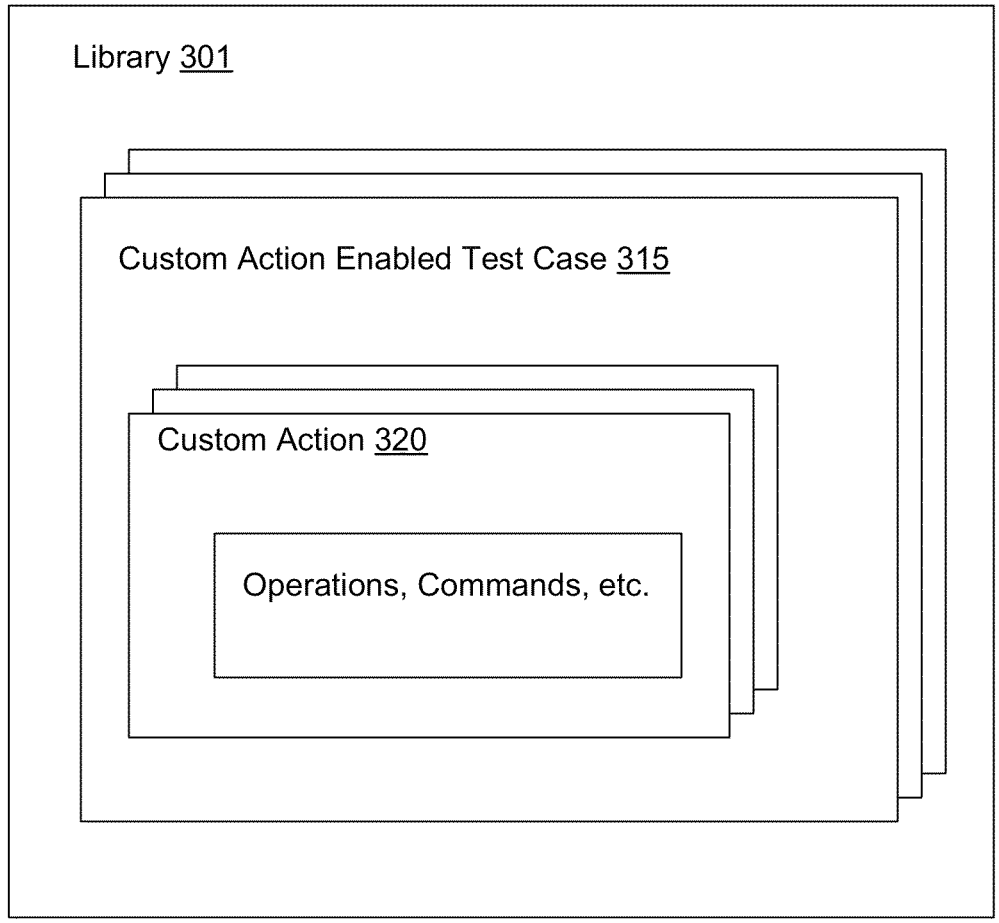
FIG. 3 is a block diagram of an example library and its contents, in accordance with an embodiment.

FIG. 3 depicts a block diagram of an example library 301. Various libraries 301 may be created for various products. As shown in FIG. 3, a library 301 comprises at least one custom action enabled test case 315. In an embodiment, a user can create, delete, and edit libraries 301. In one embodiment, a single library 301 may be used for a plurality of products and/or instances (e.g., version(s) or build(s) within a version) of a software item. In some embodiments, each library 301 is unique to a particular product and/or instance of a software item. Library 301 may be stored within tangible computer readable storage of a computing environment 210 (e.g., 210A, 210B) or in a storage that communicatively coupled with a computing environment 210.

In an embodiment, a library 301 may contain one or a plurality (e.g., two, hundreds, thousands, or more) of custom action enabled test cases 315 for a particular product. Each custom action enabled test case 315 may comprise a plurality of custom actions 320. Libraries 301, custom action enabled test cases 315, and custom actions 320 may be created, edited, stored, and utilized independently of each other. For example, one custom action enabled test case 315 may be a part of multiple libraries 301. Similarly, one custom action 320 may be used in a plurality of custom action enabled test cases 315.

Custom Action Layer

With references to FIGS. 1 and 4A-4F, the test framework 100 described herein comprises a custom action layer 140 operable to run custom action enabled test cases 315 and custom actions 320. In an embodiment, a custom action layer 140 is positioned between a test layer 150 and at least one fixture layer (e.g., product fixture layer 130, base fixture layer 120). In some embodiments, the test layer 150 and product fixture layer 130 surrounding a custom action layer 140 remain static (i.e., substantially persistent). As an example, a static test layer 150 may sit upon a dynamic custom action layer 140, which sits upon a static product fixture layer 130, which sits upon a static base fixture layer 120, which in turn sits upon a static framework layer 110. Custom actions 320 written in the custom action layer 140 are defined in the natural language of the software item under test 213. In other words, after a programmer writes an interface between a custom action layer and a fixture layer (e.g., 120 or 130), a novice that only knows how to write custom actions 320 may write custom action enabled test cases 315 for the software item under test 213 via input of natural language information and other parameters into fields via one or more graphical user interfaces 212 provided by user interface generator 211. GUIs 410, 430, and 440 of FIGS. 4A-4F are some examples of such user interfaces 212 that may be generated by user interface generator 211.

Custom Action Enabled Test Cases

Still referring to FIGS. 4A-4F, in an embodiment, a custom action enabled test case 315 comprises one or more lines 425 (actions 421, subjects 422, and values 423) which cause the custom action enabled test case 315 to perform one or more actions 421. Actions 421 are comprised of both fixture actions, which are substantially persistent, and custom actions, which are dynamic. Custom action enabled test cases 315 can be run automatically (i.e., they may be automated) when invoked by a test from test layer 150.

Figure 4A:
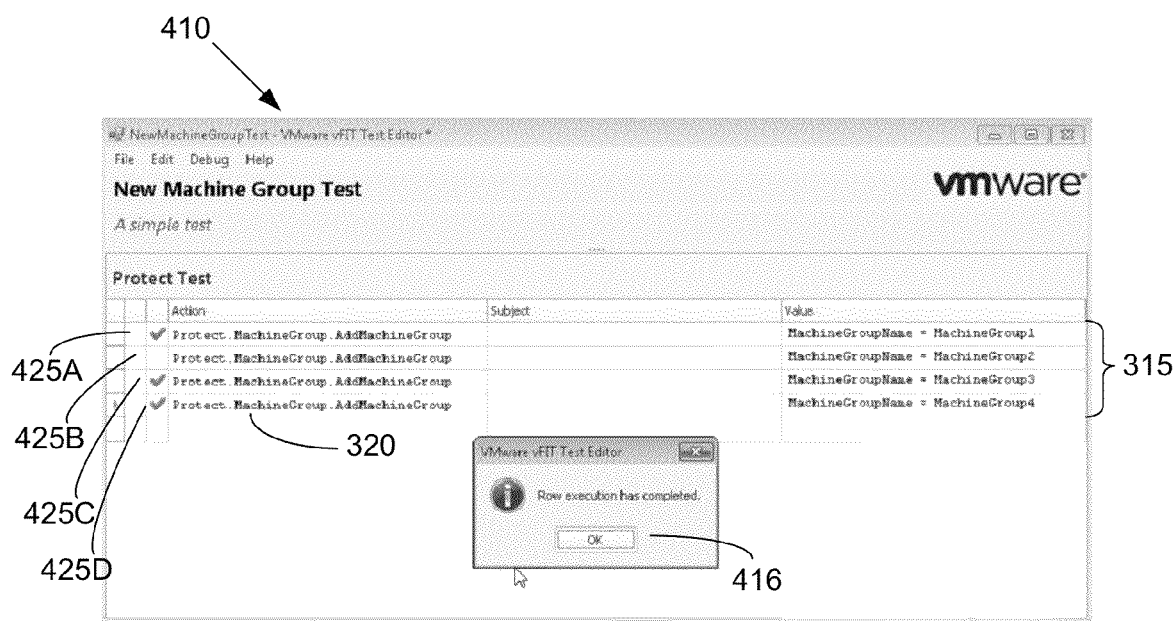
FIGS. 4A-4J are examples of a graphical user interfaces, in accordance with an embodiment.

With reference to FIG. 4A, in some embodiments, a custom action enabled test case 315 can be written simply by entering parameters 426 (see e.g., FIG. 4D) into fields on lines 425. Custom testing agent GUI 410 illustrates an example which may be utilized to input parameters 426 into lines 425 (e.g., 425A and 425B). In various embodiments, custom testing agent GUI 410 can test lines 425 for syntax errors 450 (as shown in FIG. 4E) to see if they will operate correctly during a test. It should be noted that in some embodiments custom actions 320 are executed in response to a user input instructing a check of whether the custom action enabled test case 315, custom action 320 or a sub-portion of either (e.g., a line) will execute correctly, while in other embodiments, a user interface may automatically validate such execution of a line of a custom action 320 or a custom action enabled test case 315 in response to completion of entries of all required parameters into the line. As an example, by inclusion of check marks FIG. 4A shows that lines 425A, 425C and 425D have validated as being executed successfully, while line 425B (which does not have a check mark) has not executed. In FIG. 4A, message window 416 has been presented following the successful validation of the execution of a row, such as row 425D.

Figure 4B:
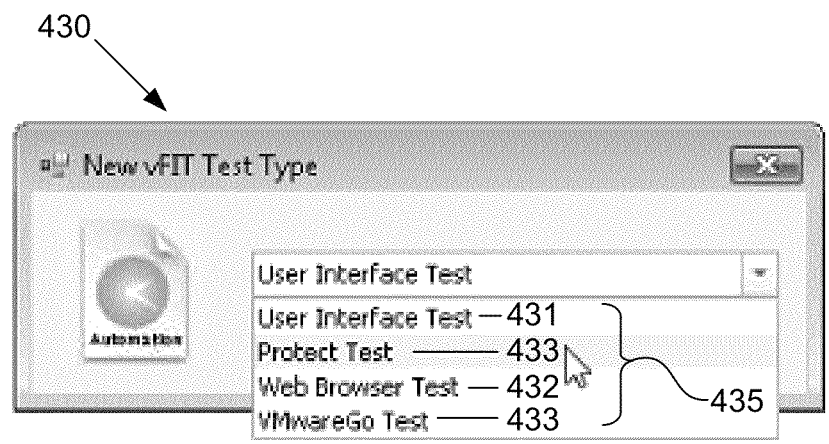
Figure 4C:
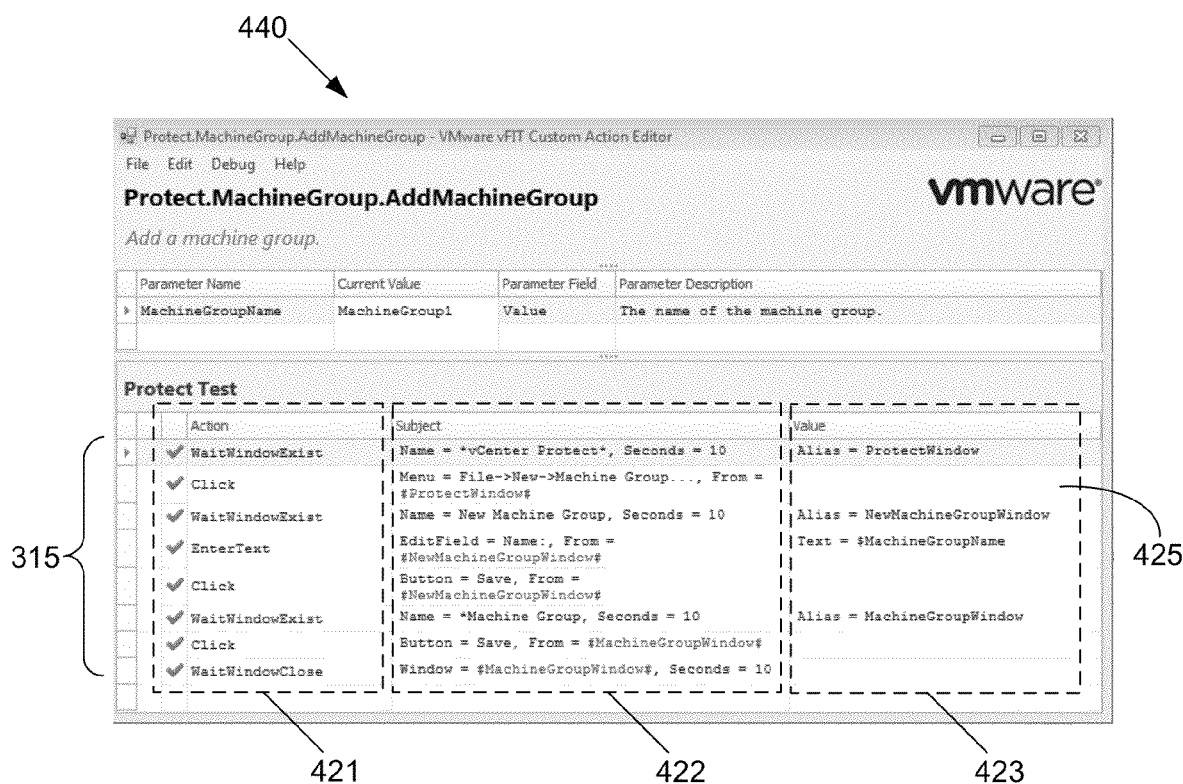

In reference to FIG. 4B, in an embodiment, a new test type GUI 430 is created by user interface generator 211 and presented as a user interface 212 via which a user can create a custom action enabled test case 315. In some embodiments, at least one base test type 435 is provided to a user. For example, base test types 435 which custom action enabled test cases 315 are based upon may include, but are not limited to: user interface tests 431; web browser tests 432; API tests; software development kit (SDK) tests, a product specific test 433 etc. As examples, user interface tests 431 can manipulate, and run tests against a user interface 212 such as the Windows™ desktop, while web browser tests 432 can test websites and web services using various browsers. As is illustrated in FIG. 4B, in some embodiments, a user is presented with the option to create a completely new custom action enabled test case 315, or to choose to modify a stored custom action enabled test case 315 or base test type 435.

With continued reference to FIGS. 4A-4F, product specific tests 433 provide users with additional custom actions 320. As discussed above, product specific tests 433 may also be utilized as a base test type 435. Product specific tests 433 may be unique to a product and may be based on (i.e., an extension of) another test. In other words, a product specific test 433 includes all of the fixture actions and custom actions 421 in from a base test type 435, as well as additional fixture actions and custom actions 421 specific to the product test type. As examples, a Protect test is based on a user interface test 431, while testing VMware Go™ test is based on a web browser test 432. As described herein, products may include, but are not limited to: applications, user interfaces, APIs, websites, web services, SDKs, custom products, etc. It should be understood that a specific product test type 433 may also be a base test type 435 itself (i.e., it is both a specific product test type 433 and a base test type 435).

As discussed briefly above, in some embodiments, custom action enabled test cases 315 may be stored independently of libraries 301 of custom action enabled test cases 315. For example, a single custom action enabled test case 315 may be used in a plurality (e.g., two, hundreds, thousands, or more) of libraries 301. Thus, by changing a single custom action enabled test case 315, every library containing that custom action enabled test case 315 will have changed. If a custom action enabled test case 315 is deleted, every library 301 that contained that custom action enabled test case 315 will no longer be able to access that custom action enabled test case 315. In some embodiments a notice may be sent to a user indicating that a custom action enabled test case 315 has been deleted or cannot be found. Via the custom action layer 140, custom action enabled test cases 315 reduce the size of a test (e.g., a test in a test layer 150) from, for example, hundreds or thousands of operations (e.g., operations to be performed at a fixture layer 120) to a fewer number of custom actions 320. Moreover, the language in which custom actions 320 and custom action enabled test cases 315 are written in is easier to comprehend than a specific programming language (e.g., C, C#, Java) used for writing typical tests in a test layer 150. This allows a non-programmer to create or modify many tests quickly.

Custom Actions

Referring to FIGS. 4A and 4C-4F, collections of actions 421 may be chosen for various products and used in various custom action enabled test cases 315. In one embodiment, a line 425 (also referred to as a step or row) of a custom action enabled test case 315 comprises three parameters 426: (1) an action (e.g., a name, a reference to an action 421, etc.), (2) a subject 422, and (3) a value 423. A subject 422 refers to an object or software item under test 213, and a value 423 indicates what to change the subject 422 to and/or check the subject 422 against. In an embodiment, subjects 422 and values 423 are comma delimited lists of key value pairs. Consider an embodiment where a user enters a custom action 320 as the action. The custom action 320 performs at least one operation (or step, command, etc.) on a subject 422. A feature of custom actions is that parameters are expressed in natural language type words. Because of this, custom actions 320 are easily maintainable as they do not require code to be written or compiled before being run.

Custom actions 320 may be stored and used independently of custom action enabled test cases 315 and/or libraries. For example, a user may create and/or edit a custom action 320. In various embodiments, a custom action 320 may be modified (e.g., given a description, modifying a name, etc.) via a GUI such as custom action editor 440. While the custom testing agent GUI 410 allows a user to modify custom action enabled test cases 315, the custom action editor 440 allows a user to modify custom actions 320. A user may store a custom action 320 independently of a custom action enabled test case 315. In one embodiment, when a user is creating a custom action enabled test case 315, they may simply insert (or incorporate) a stored custom action 320. This allows a user to edit every custom action enabled test case 315 that incorporates a particular custom action 320 by editing only the particular custom action 320. In some embodiments, a user will be notified if a custom action 320 has been deleted, edited, or cannot be found.

Custom Editors

Referring again to FIGS. 2A and 2B and also to FIGS. 4A-4F, in an embodiment, a user interface 212 is created by user interface generator 211. For example, a user interface 212 may present a custom testing agent graphical user interface (GUI) 410 that allows a user to enter a series of custom test actions 320 and/or create a custom action enabled test case 315. GUI 410 of FIG. 4A is one example of such a GUI. Custom testing agent GUI 410 may allow a user to save/store custom action enabled test cases 315 in a library 301 (FIG. 3), open libraries 301 of custom action enabled test cases 315, and run custom action enabled test cases 315.

Figure 4D:
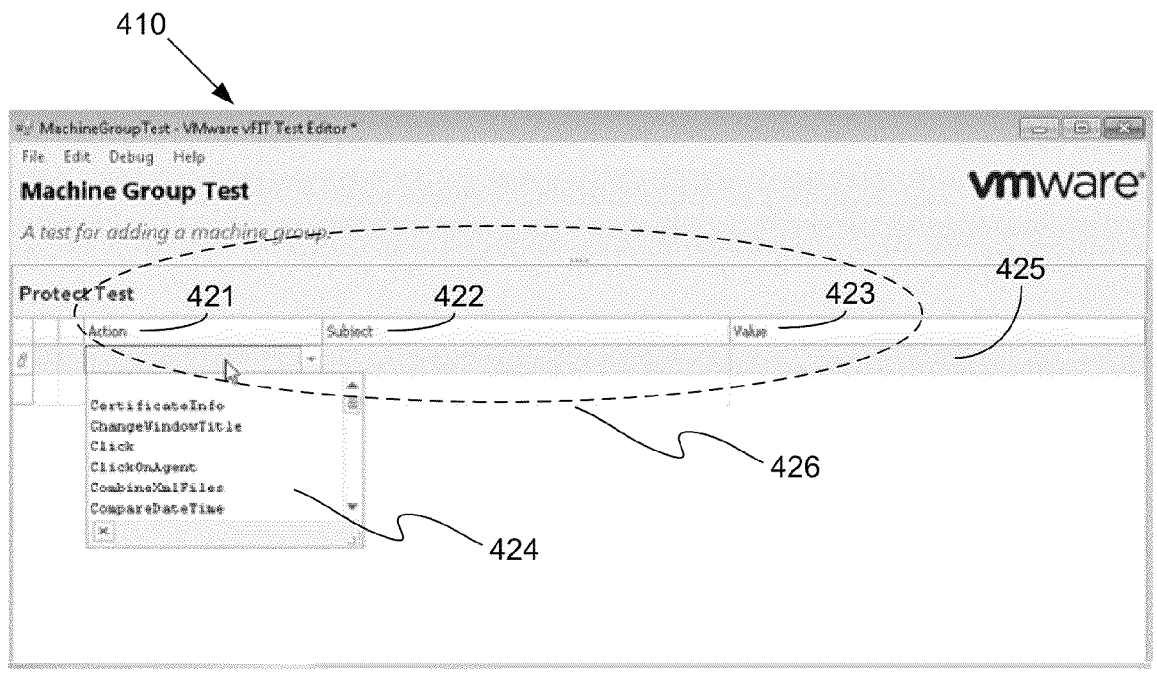
Figure 4E:
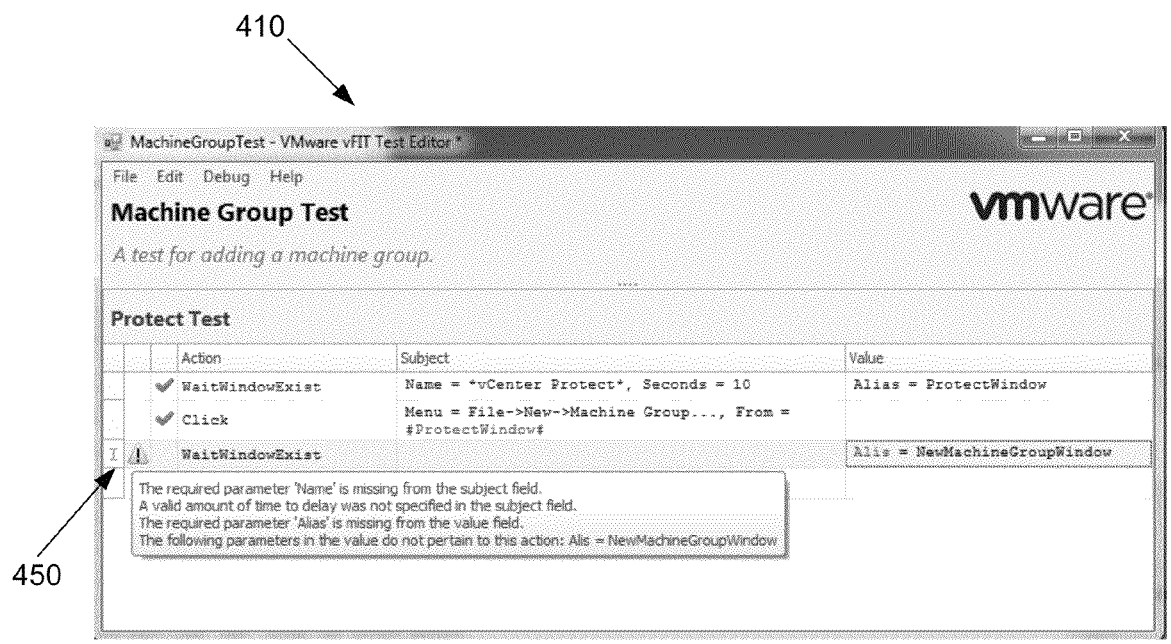
Figure 4F:
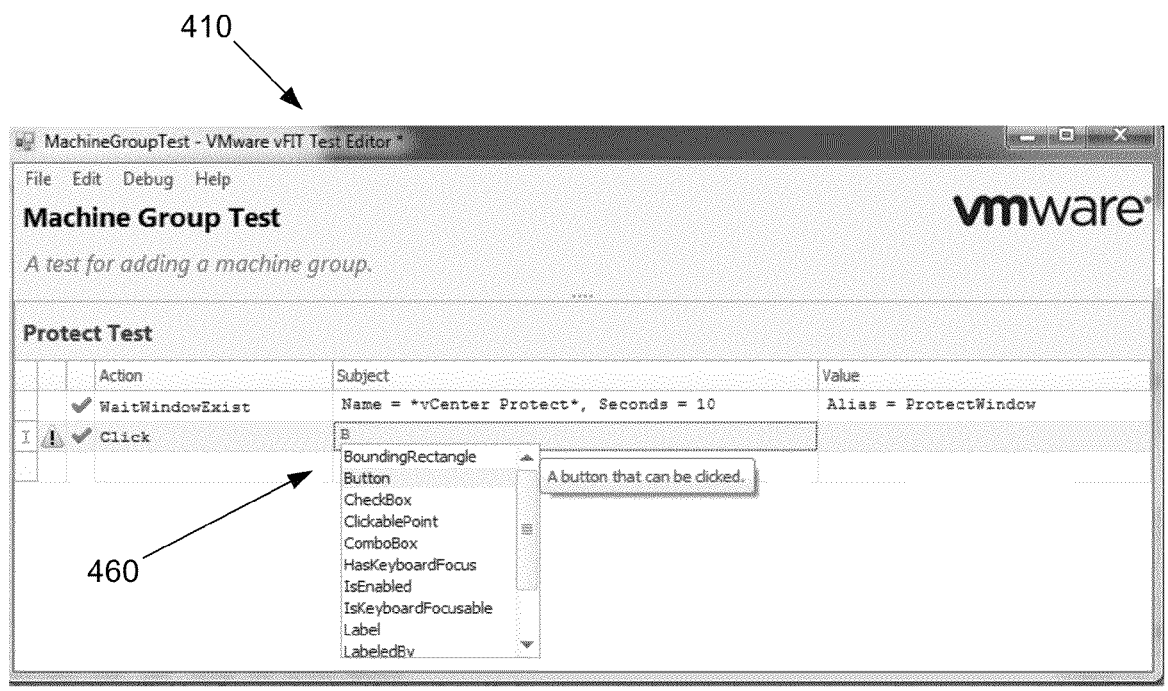

As illustrated in FIG. 4D and FIG. 4E, custom testing agent GUI 410 also allows a user to check a line 425 of a custom action enabled test case 315 for syntax errors 450, valid parameters 426, etc. In some embodiments, custom testing agent GUI 410 allows users to run lines 425 of a custom action enabled test case 315. In some embodiments, custom testing agent GUI 410, may be executed from a command line or as part of an automated build process. As illustrated in FIG. 4F, in some embodiments, auto-completion 460 options are employed and presented such that when a user types a portion of a parameter 426, the custom testing agent GUI 410 predicts and presents one or a list of parameters 426 the user is beginning to enter without the user completely typing in a parameter 426.

Altering a Test while a Test is in an Active State

Figure 4G:
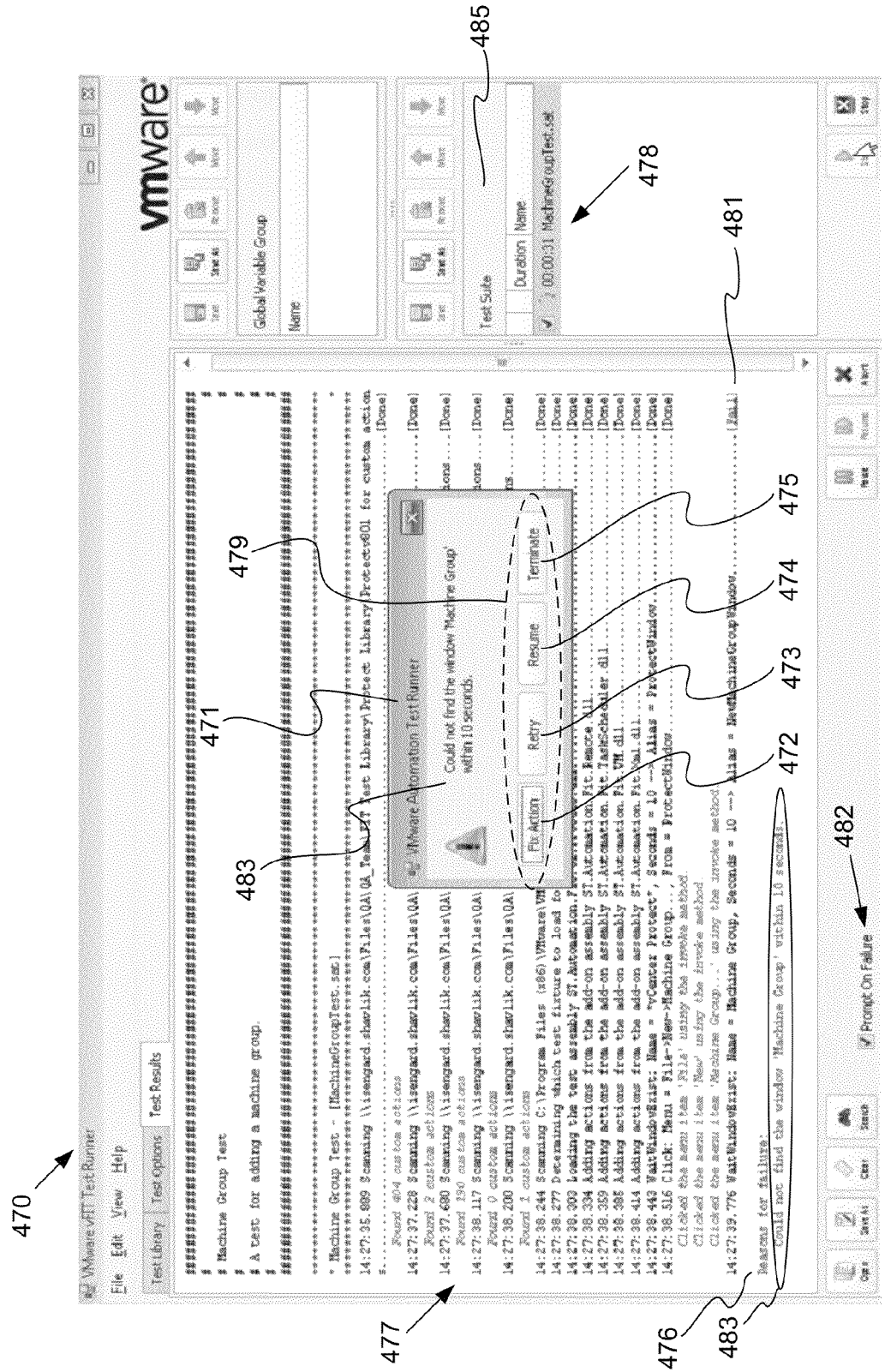
Figure 4H:
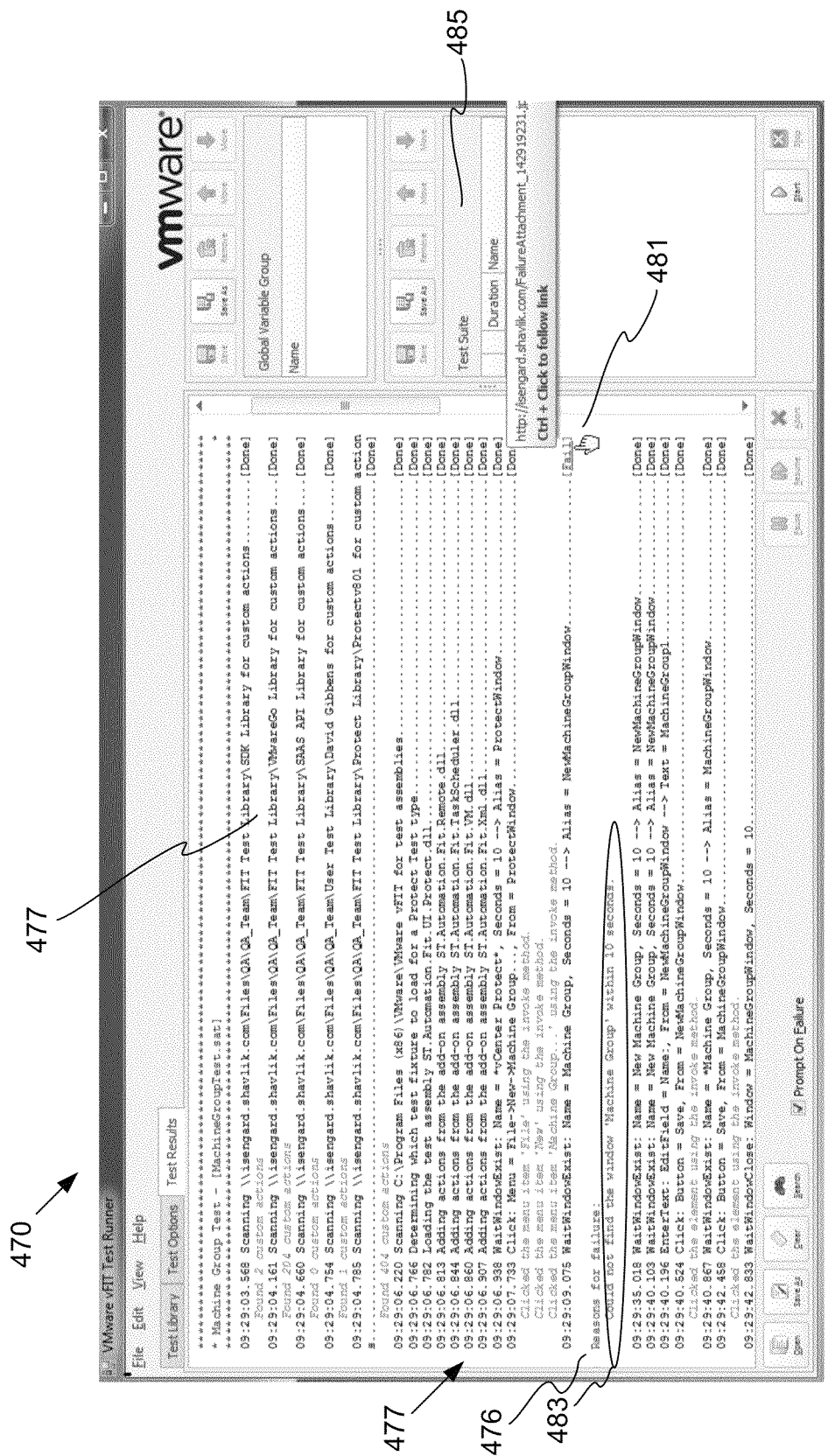
Figure 4I:
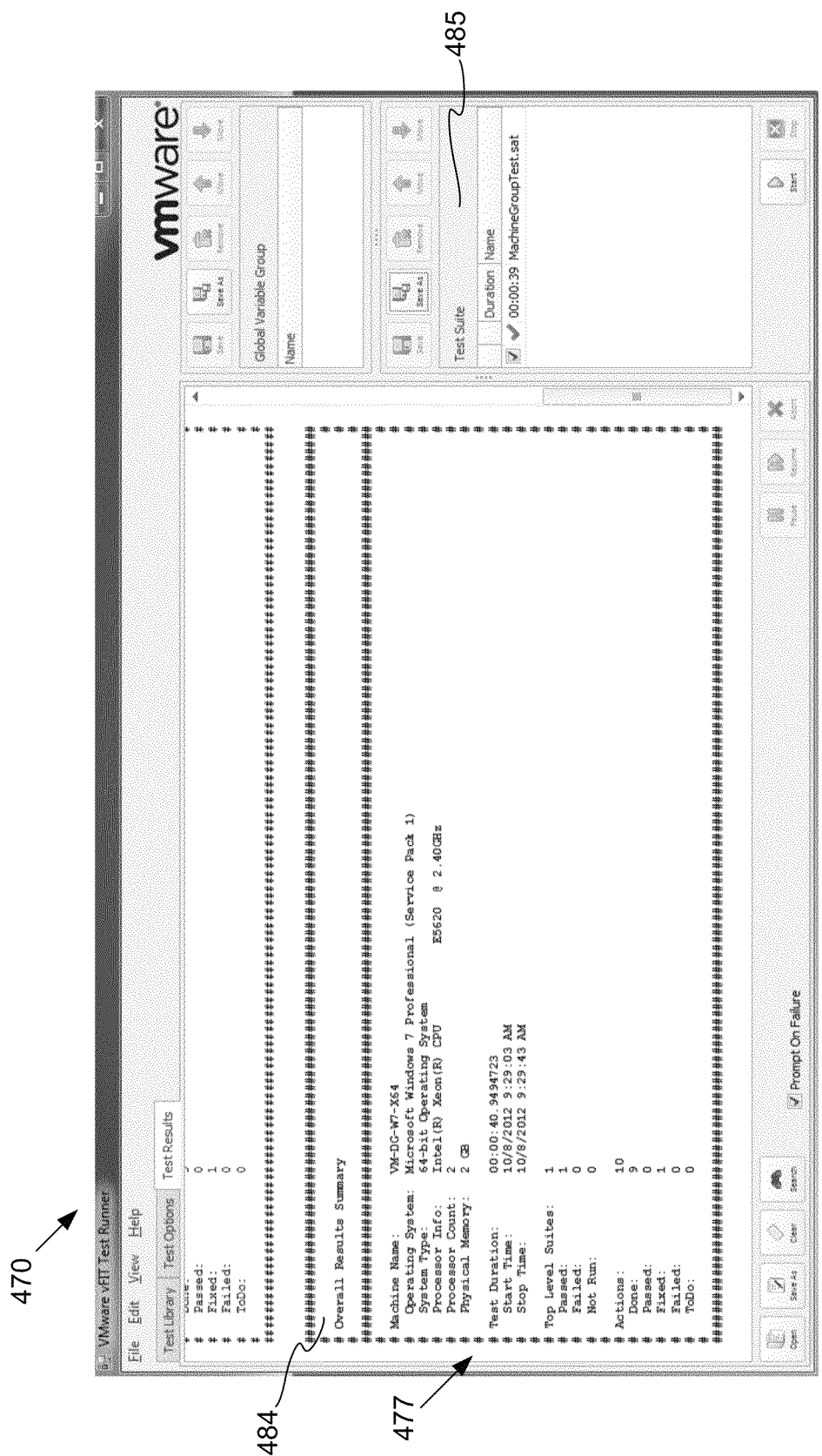

FIGS. 4G-4I illustrate various portions of a test log 477 generated in a test runner 470. As depicted in by the portion of test log 477 shown in FIGS. 4G and 4H, in some cases, a test case 315 will stop when an error 476 is found. When this occurs, a user interface 471 is presented with one or more options 479. In some embodiments, user interface 471 may present an option 472 to undertake a "fix action" to alter the test while it is maintained in the active state. In some embodiments, user interface 471 may present an option 473 to retry the test from the beginning (or from some other point between the beginning and the occurrence of the error condition 476). In some embodiments, user interface 471 may present an option 474 to resume the test from the point of the error condition, without altering the underlying test, thus accepting the error as a legitimate failure. In some embodiments, user interface 471 may present an option 475 to terminate the test. It is appreciated that options 472, 473, 474, and 475 may be presented alone or in combination with one another and/or in combination with other options.

A test case 315 can take hours or days to run. In various embodiments described herein, when a test case 315 is running and finds an error 476, the test case 315 "pauses" in an active state (i.e., a state where data created/edited by a test remains available), and allows a user to edit the paused test case 315 by selecting option 472, and then continue running the test without restarting test case 315. In some embodiments, a test case 315 is maintained in an active state within a cloud computing environment 210B in which the test case 315 is running. In some embodiments, a state of a virtual machine upon which a test is running is maintained while a test is paused. As briefly discussed in the Custom Action section, it should be understood that in some embodiments, both test cases 315 and custom actions 320 may be modified. If a custom action 320 is modified, all subsequent calls to that custom action 320 will reflect the change. It should further be appreciated that a test case 315 may include a custom action and thus be a "custom action enabled test case" or may include no custom actions. As such, error conditions that a user is permitted to alter while a test is maintained in an active state include errors in custom actions within a test case 315 and errors in portions of a test case 315 which do not involve a custom action.

As shown in FIG. 4G, in various embodiments, when an error 476 is found while a test case 315 is running, the test case 315 pauses. In other words, when an error is found, a test case 315 stops executing actions, but remains active. In various embodiments, while a test case 315 is paused, registers, variables, and parameters maintain the state they were in when the test paused. In some embodiments, all prior testing information 478 up to the occurrence of the error condition 476 is maintained. For example, this information may be maintained and accessed via a GUI or portion thereof such as test suite 485, which lists all tests which have been executed or are scheduled to be executed.

Error conditions that may cause a test case 315 to pause include, but are not limited to: not being able to find an item of software (e.g., software item under test 213) at a prescribed location, not being able to find a network connection, attempting to use an invalid value, not being able to access a machine or data, action syntax errors, etc. Thus, it should be appreciated that error 476, illustrated in FIG. 4G, is presented by way of example and not of limitation and is only one of several types of error conditions that may cause execution of test case 315 to pause.

In various embodiments, test case 315 can be run through a GUI such as a test runner 470, or from within a custom testing agent GUI 410. Although FIG. 4G shows a test runner 470 running a test, it should be understood that a test case 315 can be run from elsewhere including, but not limited to: GUIs, a command line, as part of a build process, etc. In various embodiments, screen shots 490 (of FIG. 4J) can be captured during the running of a test case 315 (e.g., by a test runner 470). In some embodiments, test runner 470 is operable to create and provide a log 477 of real-time action 421 execution results 476. It should be understood that screen shots 490 may be accessed without using a hyperlink.

As is illustrated in FIG. 4G, in various embodiments, when an error 476 occurs, a failure prompt 471 may be provided. Example failure prompt 471 prompts a user to select a user selectable option 479 of a plurality of user selectable options 479, which include, but are not limited to: (1) fix the current action or active test 472; (2) retry the current action 473; (3) resume the active test 474; or (4) terminate the active test 475. Example failure prompt 471 may also show a detailed description of the error 476 that occurred. It should be understood that actions provided by failure prompt 471 (e.g., 472, 473, etc.) may be added, edited, created, or removed in various embodiments. Moreover, in an embodiment, a user may have the option 482 to set whether test runner prompts a user upon the occurrence of an error.

In an embodiment, a user may alter a test by selecting fix an action 472 from failure prompt 471. Such selection allows editing while the executing test case 315 is paused. In various embodiments, a user may edit parameters 426, values within variables, software items, etc., while a test case 315 is paused. Editing may be performed using custom testing agent GUI 410, or another test editor. Custom testing agent GUI 410 may, in some embodiments, show a test case 315, in which actions 421 were performed successfully and which caused an error. For example, an action execution error may be indicated by an object such as a red "X", and a successfully executed action may be indicated by an object such as a green check mark. In some embodiments, the execution of an alteration to a test is validated while a test case 315 is maintained in an active state. Also, an alteration, entered via a user interface 212 that facilitates entry of the alteration and validation of the execution of the alteration, may be accepted. For example, a custom testing agent GUI 410 is one example of such a user interface that may be utilized to alter a test and employ syntax error checking 450, auto-completion 460, etc.

FIG. 4H shows an example error hyperlink 481 within a log 477. It should be noted that various types of errors 476 exist other than errors caused by custom actions 320. In an embodiment, after clicking the error hyperlink 481 within the log 477, a screen shot 490 (as illustrated in FIG. 4J) of an error 476 may appear.

Figure 4J:
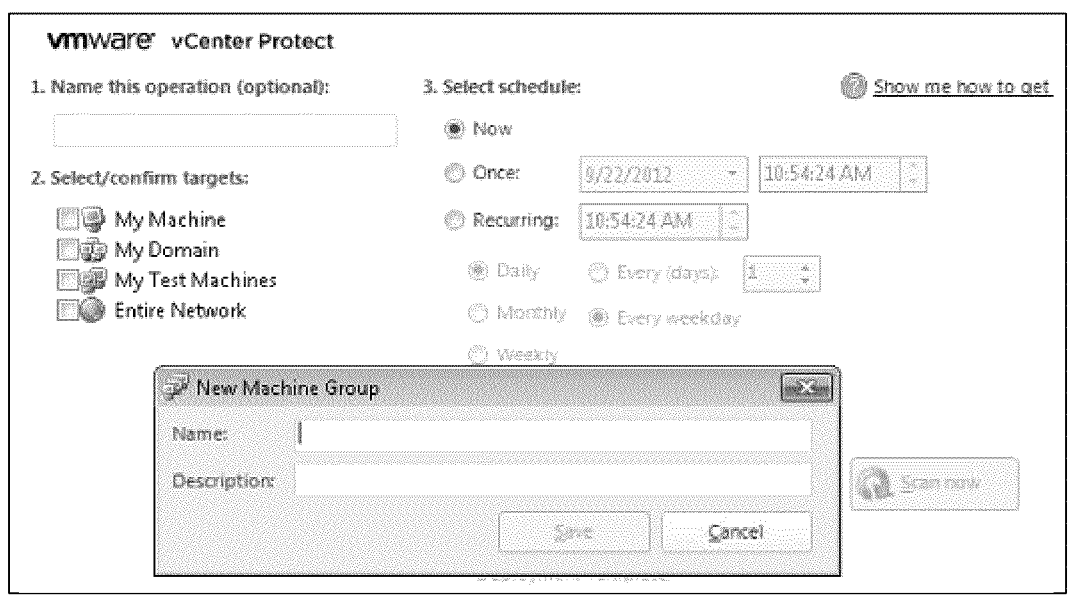
Figure 5B:
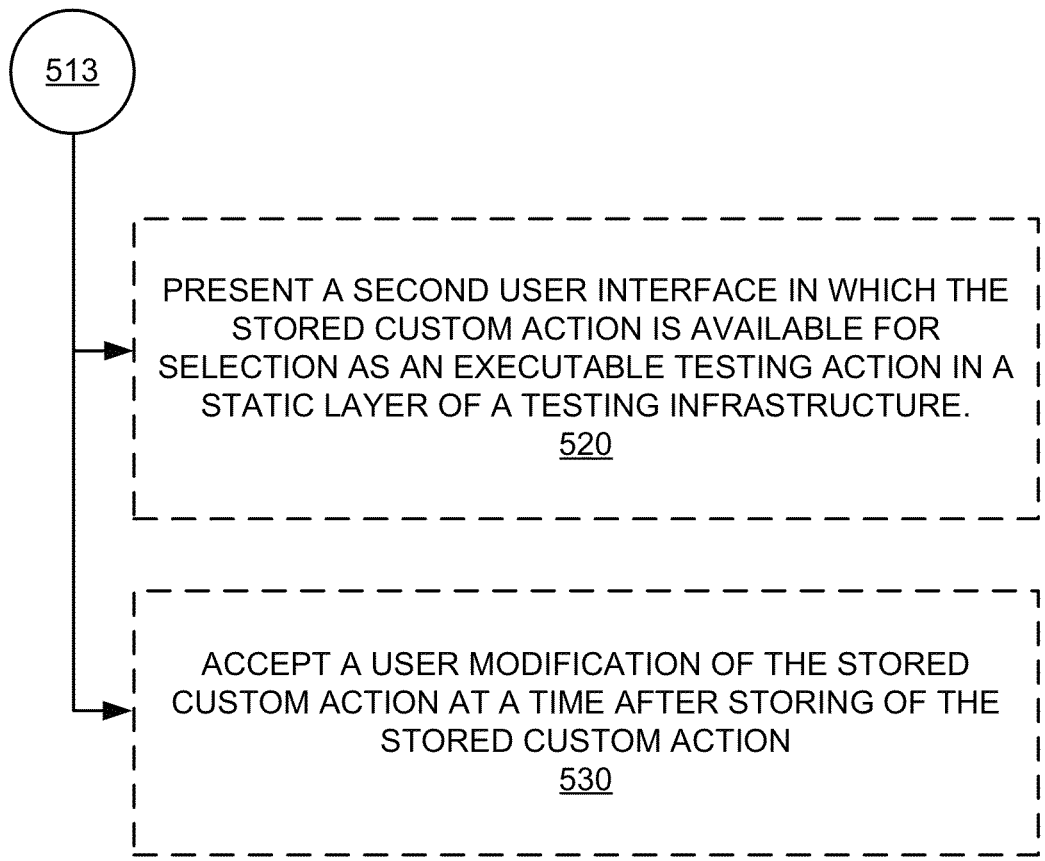

In FIG. 4J, an example screen shot 490 is shown in which a GUI labeled "New Machine Group" has appeared. In this example, a custom action 320 was attempting to access a GUI labeled "Machine Group." Thus, in this example, an error 476 occurred when the custom action 320 could not find the GUI "Machine Group," and a screen shot 490 was captured. In some embodiments, a plurality of screen shots 490 may be captured and stored. For example, a user may wish to view screen shots 490 captured prior to error 476.

In some embodiments, a user may check for syntax errors 450 while editing a parameter 426 (e.g., while changing a subject 422 or custom action 421). Because the test is still active (and paused), in various embodiments, after a user performs an edit, a user is prompted (with failure prompt 471 or otherwise) to retry, resume, or terminate a test case 315. In one example, if an error 476 is fixed and the test case 315 completes successfully, log 477 may record the number of actions with errors that occurred and the number of actions that were fixed.

For example, FIG. 4I shows a result summary 484 that comprises information including, but not limited to: the type of machine that the test was run on, test duration, the start and stop times of the test, the number of test suites (e.g., test cases 315) run, the number of test suites that were successful, failed, and/or did not run, the number of actions performed (e.g., did not fail and did not contained any validation), the number of actions that passed (e.g., contained validation), the number of actions that were fixed, the number of actions that failed, etc.

With reference again to FIG. 4G, in an embodiment, a user may retry an action 473. For example, if an action 320 attempts to perform an operation on a machine that is not yet available, the user may retry that action when the machine becomes available, and the test case 315 may continue to run.

In one embodiment, a user may resume a test 474. For example, after a test case 315 pauses due to an error 476, a user may try to resume the custom action enabled test case 315 after waiting for a period of time. In an embodiment, a test may resume at the point where the error 476 occurred. In other embodiments, a test may resume at a point prior to where the error 476 occurred. In one example, after altering a test to fix an error 476, a test may be resumed at the point when the error 476 occurred or at a point previous to when the error 476 occurred. In one embodiment, by resuming a test, a failure is accepted as a valid failure. In an embodiment, the error 476 (or a description thereof) 483 is shown by failure prompt 471 and/or log 477.

In one embodiment, a user may terminate a test 475 upon the occurrence of an error. Terminating a test causes the test to stop running. In some embodiments, the active state is maintained after a test case 315 is terminated.

Example Methods of Use

The following discussion sets forth in detail the operation of some example methods of operation of embodiments. With reference to FIGS. 5A, 5B, 6, 7 and 8, flow diagrams 500, 600, 700 and 800 illustrate example procedures used by various embodiments. Flow diagrams 500, 600, 700 and 800 include some procedures that, in various embodiments, are carried out by a processor under the control of computer-readable and computer-executable instructions. In this fashion, procedures described herein and in conjunction with flow diagrams 500, 600, 700, and 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (210A, 210B, 220). The computer-readable and computer-executable instructions, which reside on tangible computer readable storage media, are used to control or operate in conjunction with, for example, one or some combination of processors of the computing environment (210A, 210B, 220). It is appreciated that the processor(s) may be physical or virtual or some combination thereof (it should also be appreciated that a virtual processor is implemented on physical hardware). Although specific procedures are disclosed in flow diagrams 500, 600, 700, and 800, such procedures are examples. That is, embodiments are well suited to performing various other procedures or variations of the procedures recited in flow diagrams 500, 600, 700, and 800. Likewise, in some embodiments, the procedures in flow diagrams 500, 600, 700, and 800 may be performed in an order different than presented and/or not all of the procedures described in one or more of these flow diagrams may be performed. It is further appreciated that procedures described in flow diagrams 500, 600, 700, and 800 may be implemented in hardware, or a combination of hardware with firmware and/or software. In some embodiments, one or more of the procedures described in flow diagrams 500, 600, 700, and 800 may be implemented in response to payment of a fee and/or implemented within or via a cloud-based computing environment in response to payment of a fee and/or as part of a fee based service.

FIG. 5A is a flow diagram 500 of a method of creating a custom action, in accordance with various embodiments. A custom action can be a command, action, operation, etc. As discussed above, custom actions 320 may be incorporated into custom action enabled test cases 315.

At procedure 510 of flow diagram 500, in one embodiment, user interface generator 211 presents a custom testing agent user interface 212 (e.g., GUI 410 of FIG. 4A) for entry of a custom action 320. As has been discussed, in various embodiments, user interface generator 211 may be implemented as a portion of computing environment 210A or as a portion of cloud computing environment 210B.

In an embodiment, a custom testing agent GUI 410 allows a user to write, test, and/or execute a step of a custom action enabled test case 315. A custom action enabled test case 315 may be written by entering an action (see e.g., FIGS. 4A-4G) 421, a subject 422 and a value 423 into a line 425 of a custom action enabled test case. In some embodiments, actions 421, subjects 422 and values 423 may be chosen from a list 424. In other embodiments, auto-completion options 460 are employed such that when a user types a portion of a parameter 426, the custom testing agent GUI 410 predicts one or more parameters 426 the user is beginning to enter without the user completely typing in the parameter 426.

In various embodiments, separate fields are provided for the entry of parameters 426. In an embodiment, a first field for entry of an action 421 to be performed is presented. For example, custom testing agent GUI 410 comprises a space to enter an action 421. A second field for entry of subject 422 (e.g., a software item under test 213) on which the action 421 (i.e., operation) is to be performed is presented. For example, custom testing agent GUI 410 comprises a space to enter a subject 422. A third field for entry of a value 423, which is to be tested against or changed based upon the action 421 entered into the first field, is presented. For example, custom testing agent GUI 410 comprises a space to enter a value 423.

At procedure 511 of flow diagram 500, in one embodiment, responsive to receipt of a sub-portion of a line 425 of the custom action 320 via the user interface 212, the sub-portion is automatically checked for errors in syntax 450. Additionally or alternatively the sub-portion may be checked for auto-completion options 460. For example, while entering a parameter 426, a yellow exclamation mark will appear as the user types and highlight the syntax errors 450, missing parameters 426, invalid parameters 426, and/or unnecessary parameters 426 present during each character typed to verify whether the line 425 (i.e., custom action 320) will operate correctly when run. While a user is creating a custom action enabled test case 315, when a syntax error is found, parameters are missing, or parameters are incorrectly included, a user may hover over an error and a description of an error may appear. In one embodiment, parameters 426 that are invalid are highlighted. For example, an invalid parameter may be shown in red text. In an embodiment, a line 425 refers to a line of code, for example, a custom action 320, subject 422, and value 423. In various embodiments, auto-completion options 460 are presented. For example, selectable parameter auto-completion options 460 may be provided to a user when the user enters a sub-portion of a parameter 426.

At procedure 512 of flow diagram 500, when included, in one embodiment, responsive to a completed entry of the line 425 via the user interface 212, the execution of the line 425 of the custom action 320 is validated for proper execution without errors. The validation may be implemented automatically in response to completion of entry of all parameters on the line or in response to a user request for such validation. For example, once all parameters 426 are entered, a custom testing agent GUI 410 may automatically check that the line 425 will operate correctly when run. In another embodiment, line 425 can be validated and executed individually after creation.

At procedure 513 of flow diagram 500, when included, in one embodiment, the custom action 320 is stored as a selectable action 421 in a dynamic layer of a testing infrastructure which is associated with a particular instance (e.g., version or build within a version) of a software item under test 213. For example, users may store custom test actions 320, custom action enabled test cases 315, and libraries to be run by a custom action layer 140 comprised within a framework 100. In an embodiment, custom actions 320, custom action enabled test cases 315, and libraries may be stored on a user owned computer system. A user owned computer system may be a target computing environment 220, or a computing environment 210A that includes testing framework 100. In some embodiments, any authorized user owned computer system may add, delete, or edit custom actions 320, custom action enabled test cases 315, and/or libraries of custom action enabled test cases 315. In another embodiment, custom actions 320, custom action enabled test cases 315, and libraries can be added, deleted, edited, and stored on a cloud-based computing environment 210B by an authorized user.

At procedure 520 of flow diagram 500, when included, in one embodiment, a second user interface in which the stored custom action is available for selection as an executable testing action in a static layer of a testing infrastructure is presented. For example, user interface generator 211 can generate a user interface for entry of a test for test layer 150 of framework 100, and a stored custom test action 320 may be entered as a line of the test, and then executed at completion of entry and/or whenever the test is run.

At procedure 530 of flow diagram 500, when included, in one embodiment, a user modification of the stored custom action 320 is accepted at a time after storing of the stored custom action 320. In other words, a user may edit a custom action 320, a custom action enabled test case 315, or a library 301 after it has been saved.

Figure 6:
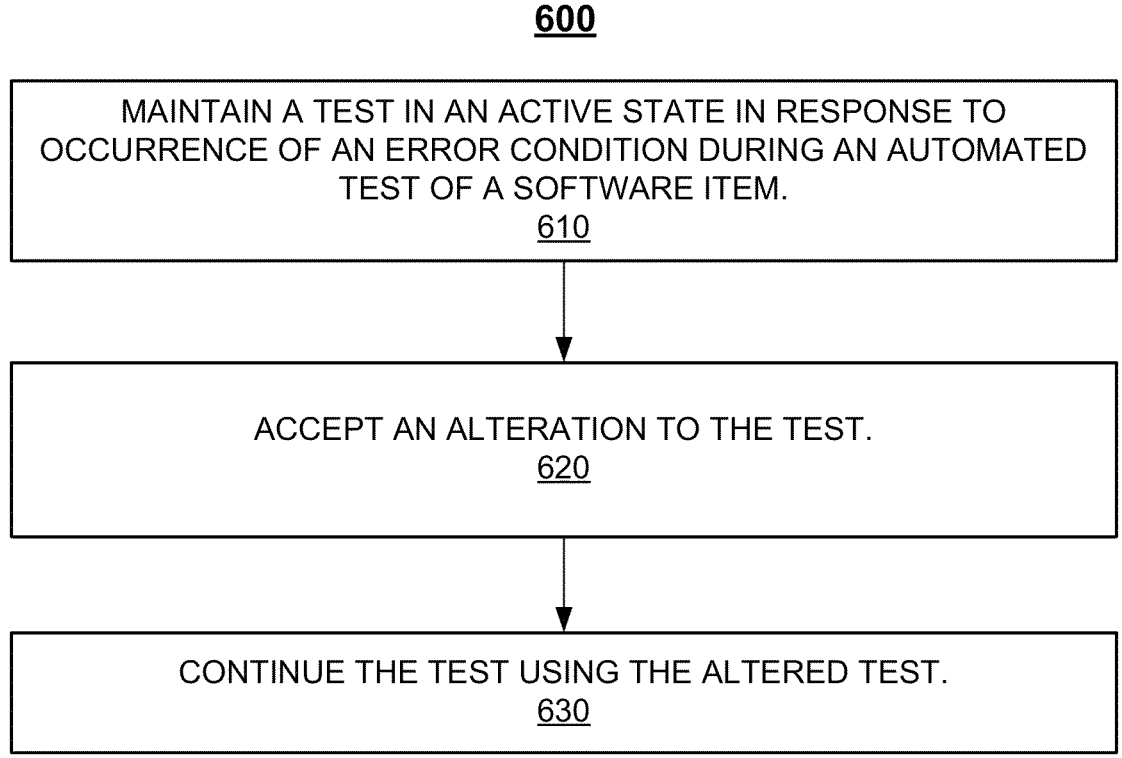
FIG. 6 illustrates a flow diagram of a method of software item testing, in accordance with various embodiments.

FIG. 6 is a flow diagram 600 of a method of software item testing, in accordance with various embodiments.

At procedure 610 of flow diagram 600, in one embodiment, in response to occurrence of an error condition 476 during an automated test of a software item, the test is maintained in an active state. In one embodiment, a test (e.g., a custom action 320, a custom action enabled test case 315, a test fixture, etc.) is maintained in an active state within a computing environment 210A, 210B in which the test is running. In one embodiment, a state of a virtual machine (e.g., 210A, 220, etc.) upon which a test is running is maintained.

In an embodiment, maintaining the test in an active state refers to when the test is paused at the point in the test where the error condition 476 occurred. For instance, when an error 476 occurs a test is paused so that the test may be resumed without restarting the test. In one embodiment, an alteration to the test is accepted while the test is in this paused state. For example, a custom testing agent GUI 410 or another means of data entry may be used to alter a test while the test is paused.

In one embodiment, testing of the software item then continues using the altered test. In other words, a test resumes (i.e., continues) from the point at which it was paused in an active state, such as at the point where an error 476 occurred. In other embodiments, a test may resume from a point prior to the error 476 occurring. In one embodiment, all prior testing information up to the occurrence of an error condition 476 is maintained. As an example, data changed or used during the test may be maintained when a test is paused, or after a test is terminated.

At procedure 620 of flow diagram 600, an alteration to a test is accepted. For example, a custom testing agent GUI 410 or another means of data entry may be used to receive an alteration to the test while the test is paused. In various embodiments, an execution of an alteration to a test is validated while the test is maintained in an active state. For example, while the test is maintained in an active state, a user may alter a test (e.g., via custom testing agent GUI 410) and check whether a test will perform correctly (e.g., check for syntax errors 450, conformity, successful execution, etc.). In various embodiments, an alteration to a test is accepted via a user interface 212 which facilitates entry of the alteration and validation of the execution of the alteration. In one embodiment, an alteration comprising a change to a custom action 320 of a custom action layer 140 of a testing framework 100 is accepted. In some examples, a custom action 320 may be added, removed, deleted, or altered. In some examples, a test may be fixed, wherein the test does not comprise custom actions 320. In an example embodiment shown in FIG. 4G, a failure prompt 471 is provided that allows a user to perform operations on a test.

At procedure 630 of flow diagram 600, the test is continued using the altered test. As discussed herein, in one embodiment, a test is continued from a point in the test where the error 476 occurred. In another embodiment, a test is continued from a point in the test prior to when the error 476 occurred. A user may be able to choose where to continue a test from, in some embodiments. For example, a system may store screen shots 490, and a user may view the stored screen shots 490. The screen shots 490 may assist a user in determining what point in a test to continue the test from.

FIG. 7 is a flow diagram 700 of a method of software item testing, in accordance with various embodiments.

At procedure 710 of flow diagram 700, in one embodiment, an automated test of a software item using a test (e.g., a custom action enabled test case 315, a custom action 320, etc.) of a testing framework 100 is initiated.

At procedure 720 of flow diagram 700, in one embodiment, a test within a computing environment (e.g., 210A, 210B, 220) in which the test is being conducted is paused. For example, in one embodiment, a test is maintained in an active state within a cloud computing environment 210B in which the test is running. In one embodiment, all prior testing information up to the occurrence of the error condition 476 is maintained while a test is paused. As examples, prior testing information includes, but is not limited to: data in memory, values within variables, parameters 426, log 477 information, etc.

At procedure 730 of flow diagram 700, in one embodiment, an alteration to a test is accepted while the test is paused. For example, a custom testing agent GUI 410 or another means of data entry may be used to alter a test while the test is paused. In one embodiment, the portion of the test which is altered, by accepting the alteration, is not a custom action 320 (for example the test may not even include a custom action 320). In another embodiment, the accepted alteration does comprise a change to a custom action 320 of a custom action layer 140 of a testing framework 100. When the custom action 320 is altered, every instance of the test which uses that alteration will immediately be altered in the same manner when the altered custom action is utilized. In this manner, an error is corrected only one time instead of many times. This reduces time in correcting such errors and also eliminates additional testing interruptions for the same error condition.

At procedure 740 of flow diagram 700, in one embodiment, a test is continued using the altered test. In one embodiment, a test is continued (i.e., resumed) from a point in the test prior to where an error 476 occurred while, in another embodiment, a test is continued from the point in the test where the error 476 occurred. In other embodiments, the test may be continued from before the point in the test where the error occurred.

FIG. 8 is a flow diagram 800 of a method of software item testing, in accordance with various embodiments.

At procedure 810 of flow diagram 800, in one embodiment, a test is paused within a computing environment in which the test is being conducted in response to an occurrence of an error condition 476 during an automated test of a software item.

At procedure 820 of flow diagram 800, in one embodiment, a plurality of user selectable options 479, with respect to a paused test, are presented.

At procedure 830 of flow diagram 800, in one embodiment, an action with respect to a paused test is implemented in response to receipt of a selection of one of a plurality of user selectable options 479. In one embodiment, the action is terminating the test. As an example, a user may select an option 475 via a GUI to terminate the test. After termination, the test cannot be continued and instead must be restarted. In one embodiment, the action comprises resuming a test from a point of an error 476 while accepting the error 476 as a legitimate issue in the software item under test. For example, in some embodiments, only particular types of errors 476 will cause a test to pause, and upon determining the cause of the error a user may elect to continue the test without altering the test.

In one embodiment, the action comprises retrying a test action that caused an error condition 476 to occur, in an attempt at reproduction of an error condition 476. For example, the error 476 may have occurred because it was waiting for access to a machine or data that did not become available in time. In that example, retrying may allow the test to run without errors after a test can access a machine or data. In other embodiments, a user may fix a test and retry the test from the beginning, or from a particular point in the test.

In one embodiment, a user interface 212 in which a portion of a test may be altered is presented while the test remains paused. For example, a user may be presented with a custom action testing GUI 410, a test editor, or some other type of user interface 212 with which to fix a test.

Scheduled Software Item Testing

Figure 9A:
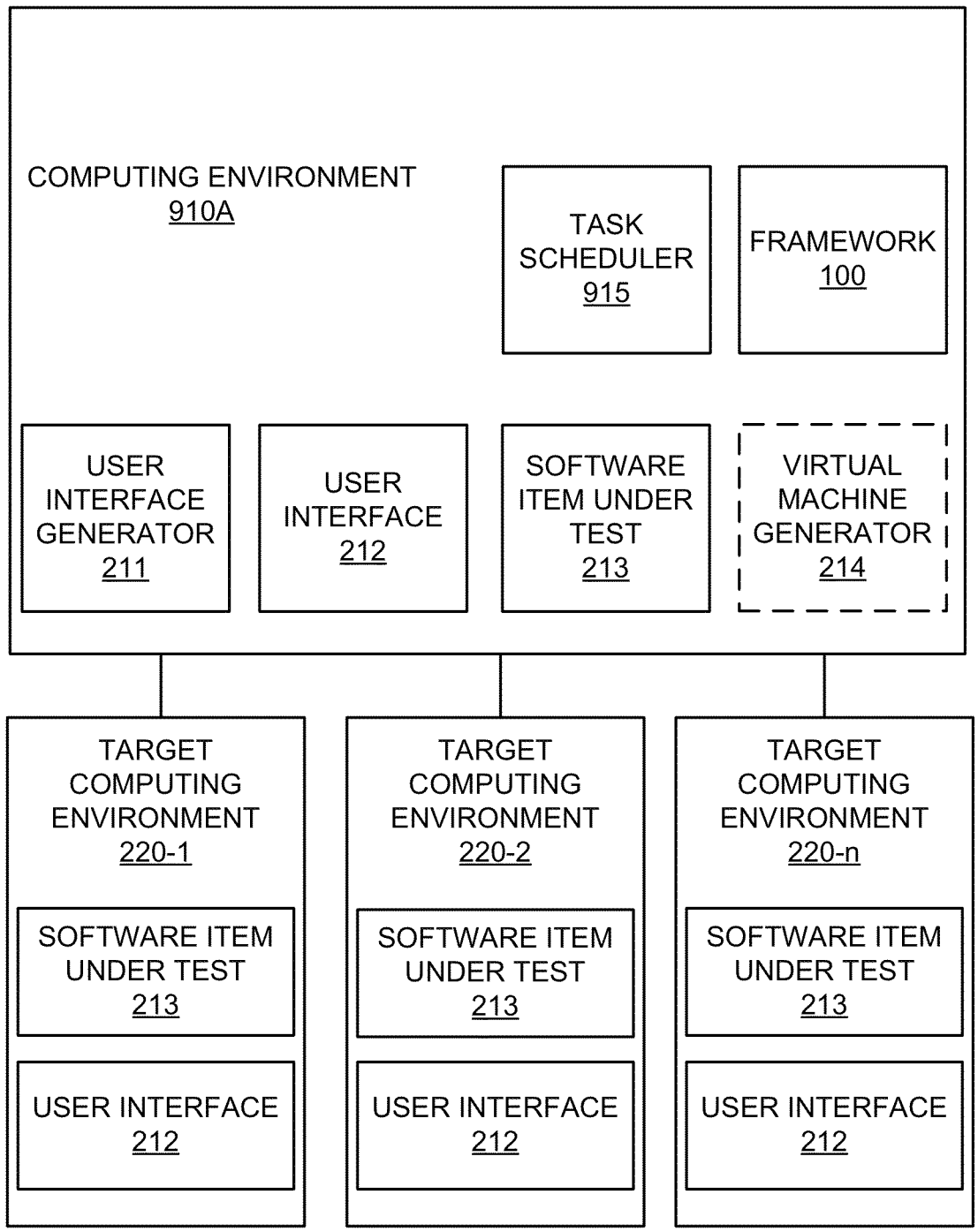
FIGS. 9A and 9B are block diagrams of some example computing environments with which or upon which embodiments may be implemented.
Figure 9B:
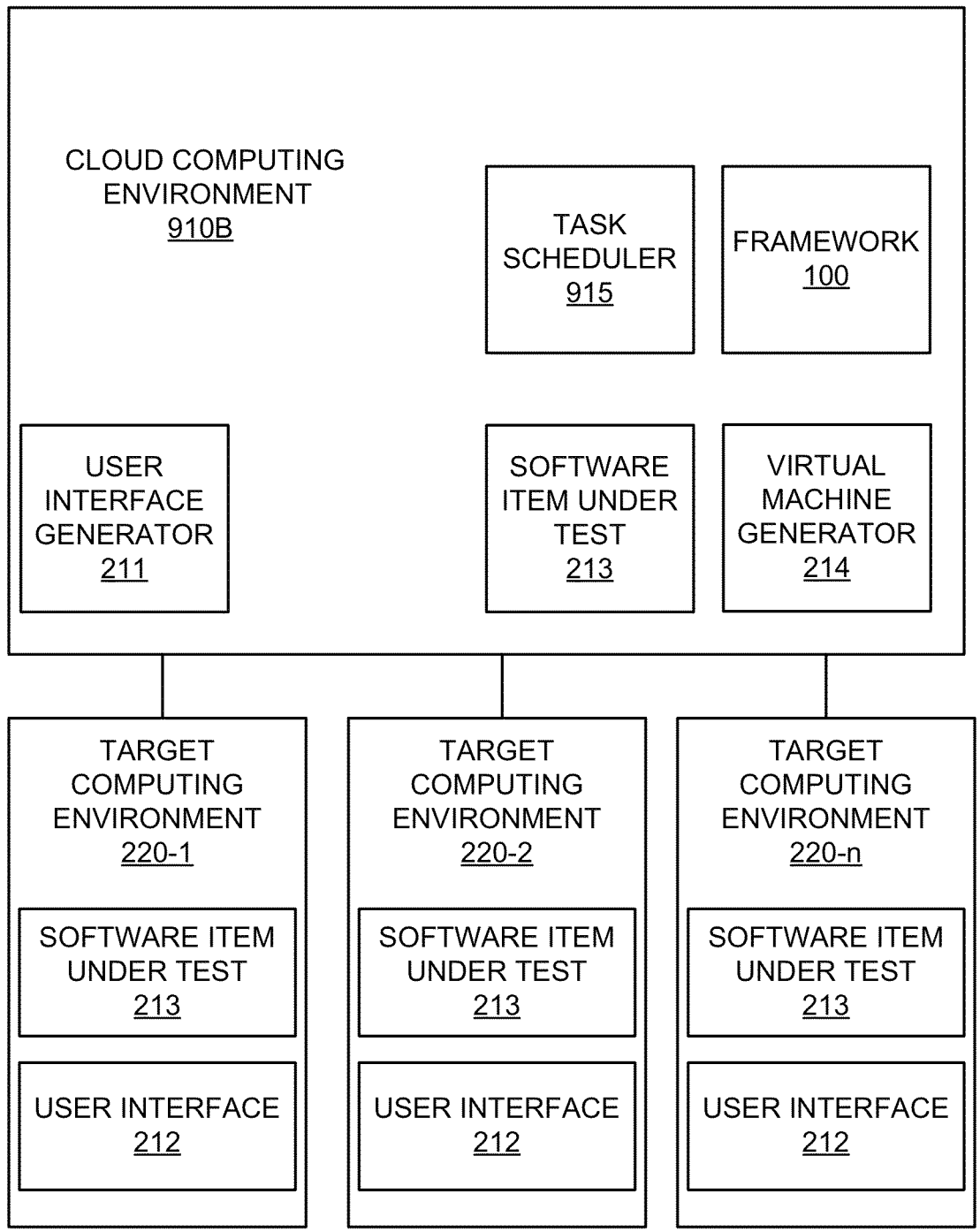

FIGS. 9A and 9B are block diagrams of example computing environments with which or upon which embodiments may be implemented.

FIG. 9A shows an example task scheduling computing environment 910A comprising embodiments of computing environment 210A, and a task scheduler 915. FIG. 9B similarly shows a task scheduling cloud-based computing environment 910B comprising embodiments of cloud-based computing environment 210B, with a task scheduler 915, and may perform some or all the processes and operations task scheduling computing environment 910A can perform. It should appreciated that access to one or more resources of task scheduling cloud-based computing environment 910B may be provided in response to payment of a fee by a user and/or as a fee based service. With a task scheduling computing environment, the operational status of an environment or an application is measured using testing infrastructure 100, as discussed above.

In an embodiment, task scheduling computing environment 910A/task scheduling cloud computing environment 910B is operable to perform continual testing. When testing on staged environments, issues existing on the live environment can go unnoticed. For example, a scheduled backup may not appear as a possible error in a staged testing environment. Task scheduling computing environment 910A/task scheduling cloud computing environment 910B is operable to perform tests and verify the operational status of a production infrastructure prior to, and post deployment (i.e., tests continue to be performed post deployment, which may help in determining the cause of errors in a non-staged environment). Moreover, task scheduling computing environment 910A/task scheduling cloud computing environment 910B may send the test results to a specified electronic notification location or locations (e.g., one or more of an electronic mail address/addresses, a social network, a wiki, a flat file, a spread sheet, a network storage location, etc.). For example, task scheduling computing environment 910A/task scheduling cloud computing environment 910B is operable to send a screen shot 490, log 477, or some other documentation of an error condition. By conducting a test with a testing framework 100 at a particular time (e.g., by using a task scheduler 915), potentially intermittent issues may be recognized and reported.

In an embodiment, a task scheduler 915 initiates a test, also referred to herein as an operational check, at specified intervals. For instance, a task scheduler may initiate a test every ten minutes or every two hours (e.g., a recurring test). In one embodiment, the test is initiated immediately, at a scheduled time in the future, or at a recurrence interval (e.g., every 10 minutes, every 2 hours, etc.).

Not only is a test initiated by the task scheduler able to check whether a machine is operational, it also has the flexibility of the testing framework 100 and its layers (e.g., fixtures 120 and 130, custom action layer 140, and test layer 150). This way, various test types 435 such as user interface tests 431, web browser tests 432, and product specific tests 433 may be run. It should be appreciated that the tests written to perform these scheduling and monitoring functions are composed in the same commonly used language as test cases 315. In some embodiments, task computing environment 910A/task scheduling cloud computing environment 910B is operable to verify certificates. For example, if Microsoft™ Task Scheduler is being used as task scheduler 915, task scheduling computing environment 910A/task scheduling cloud computing environment 910B can verify certificates for the Internet Information Services' current tool.

Various embodiments of the testing framework 100 discussed in the sections above may be scheduled. For instance, in response to an error during a scheduled test, the test may be paused within a task scheduling computing environment 910A/task scheduling cloud computing environment 910B. That is, in one embodiment, a test is paused when an error 476 occurs. In one embodiment the task scheduler 915, or other portion of the computing environment which is managing a test, can send notification to a specified electronic notification location or locations (e.g., one or more of an electronic mail address/addresses, a social network, a wiki, a flat file, a spread sheet, a network storage location, etc.) while the test is paused. For example, this may comprise sending an electronic message (email) to an electronic mail address while the test is maintained in an active, or paused, state. Additionally, in some embodiments, a single computing environment within which a test is to be performed is specified. Similarly, a plurality of computing environments within which a test is to be performed is specified.

Task scheduling computing environment 910A/task scheduling cloud computing environment 910B can be viewed as a monitoring tool and a testing tool. I.e., in addition to executing recurring tests to check whether an environment is running, collections of these test results can be accumulated over time. That is to say, the recorded history of tests executed on a recurring basis itself provides a unique measurement of functionality and performance measurements sampled over time. This time sampling is unique and provides insights into patterns or periods of instability in an environment.

Figure 10:
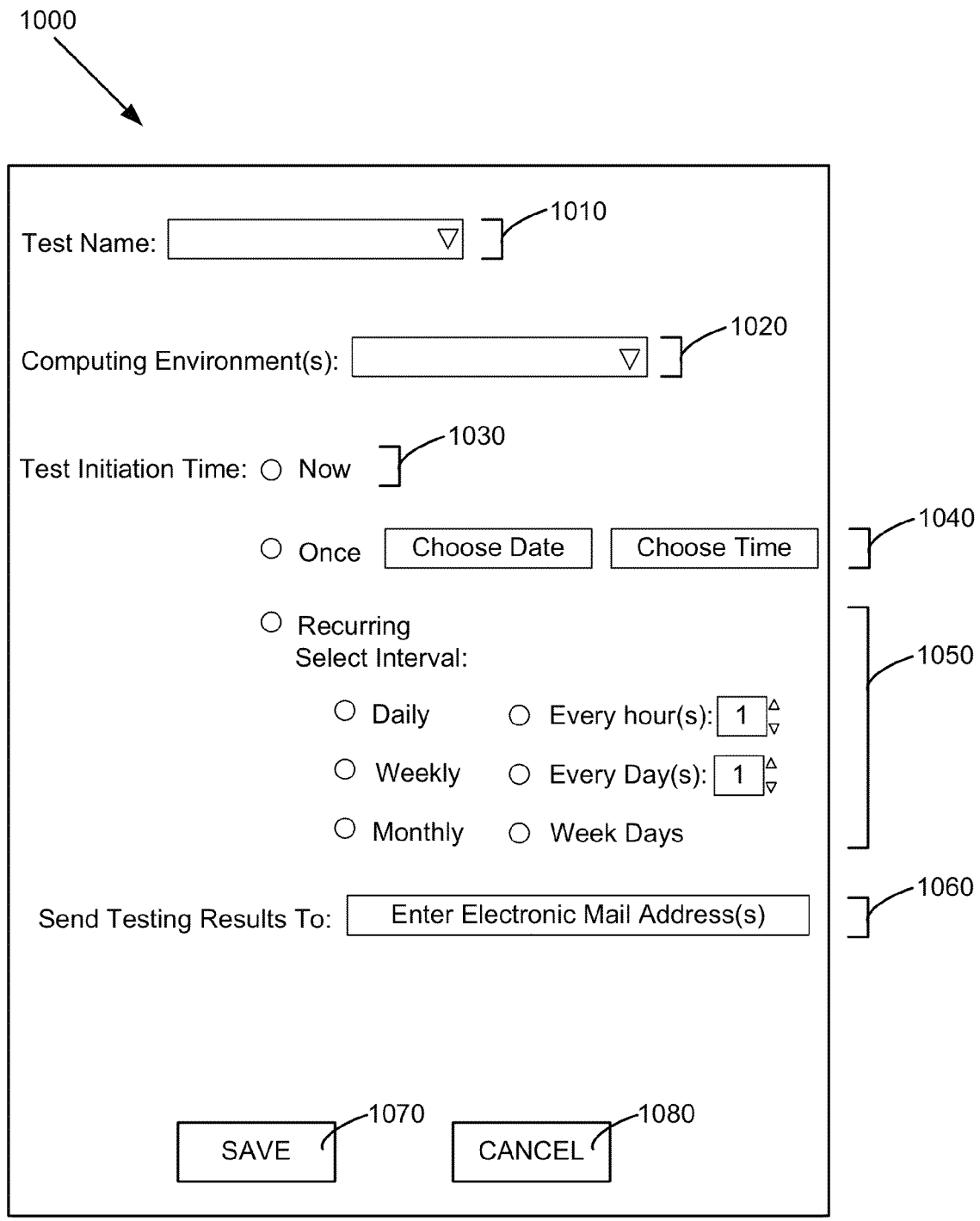
FIG. 10 illustrates an example of a testing task scheduler graphical user interface, in accordance with various embodiments.

FIG. 10 illustrates an example of a testing task scheduler graphical user interface 1000, in accordance with various embodiments. GUI 1000 is one example of a GUI 212 produced by task scheduler 915 and/or graphical user interface generator 211 for the purpose of soliciting and receiving user input to task scheduler 915. It is appreciated that GUI 1000 is provided by way of example and not of limitation and that in other embodiments, a testing task scheduler GUI may be utilized which has a greater or lesser number of features than are illustrated in GUI 1000. GUI 1000 provides test name field 1010 in which a user can enter or select the name of a software item test to be scheduled for initiation. A user may type in the name or select from a list of available tests. GUI 1000 provides a computing environment(s) field 1020 in which a user can enter or select the name of computing environment on which a test of a software item is to be carried out. It is appreciated that one computing environment may be selected or a plurality of computing environments may be selected (e.g., via a comma separated list). GUI 1000 provides a plurality of selections (1030, 1040, or 1050) with respect to test time initiation. For example, by selecting the radio button next to the word "Now", a test will be initiated immediately upon saving the scheduled test; by selecting the radio button next to the word "once" and entering a date and time into associated fields, a test will be scheduled for initiation at a specified future time; and by selecting a radio button next to the words "recurring test interval", a user may specify a recurrence interval for initiating an immediate or future test. In some embodiments, a user may be provided with an electronic notification entry field 1060 in which one or more specified electronic notification locations (e.g., one or more of an electronic mail address/addresses, a social network, a wiki, a flat file, a spread sheet, a network storage location, etc.) may be entered. For example, a plurality of electronic mail addresses and or other electronic notification locations may be entered and specified as places to which to send testing results (e.g., test logs, error reports, screen shots, and the like). After appropriate information is entered a user may click the save button 1070 to save button to save the scheduled test. In one embodiment, clicking save button 1070 will cause the scheduled test to be listed in test suite 485 (see e.g., FIGS. 4G-4I). In one embodiment, a user may select cancel button 1080 to close GUI 1000 without scheduling or altering a scheduled test of a software item.

The following discussion sets forth in detail the operation of some example methods of operation of embodiments. With reference to FIGS. 11 and 12 and, flow diagrams 1100 and 1200 illustrate example procedures used by various embodiments. Flow diagrams 1100 and 1200 include some procedures that, in various embodiments, are carried out by a processor under the control of computer-readable and computer-executable instructions. In this fashion, procedures described herein and in conjunction with flow diagrams 1100 and 1200 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (910A, 910B, 220). The computer-readable and computer-executable instructions, which reside on tangible computer readable storage media, are used to control or operate in conjunction with, for example, one or some combination of processors of the computing environment (910A, 910B, 220). It is appreciated that the processor(s) may be physical or virtual or some combination thereof (it should also be appreciated that a virtual processor is implemented on physical hardware). Although specific procedures are disclosed in flow diagrams 1100 and 1200, such procedures are examples. That is, embodiments are well suited to performing various other procedures or variations of the procedures recited in flow diagrams 1100 and 1200. Likewise, in some embodiments, the procedures in flow diagrams 1100 and 1200 may be performed in an order different than presented and/or not all of the procedures described in one or more of these flow diagrams may be performed. It is further appreciated that procedures described in flow diagrams 1100 and 1200 may be implemented in hardware, or a combination of hardware with firmware and/or software. In some embodiments, one or more of the procedures described in flow diagrams 1100 and 1200 may be implemented in response to payment of a fee and/or implemented within or via a cloud-based computing environment in response to payment of a fee and/or as part of a fee based service.

FIG. 11 is a flow diagram 1100 of a method of software item testing, in accordance with various embodiments.

At procedure 1110 of flow diagram 1100, in one embodiment, a graphical user interface is presented for scheduling a test of a software item. In an embodiment, graphical user interface generator 211 and/or a task scheduler 915, within a computing environment 910A/910B operate to provide a user interface 212 (e.g., GUI 1000) comprising test information and/or actions. This GUI may be utilized to receive user input for scheduling initiation of a test of a software item.

At procedure 1120 of flow diagram 1100, in one embodiment, specified information regarding conduct of a test is received via the presented graphical user interface. The specified information includes a test time for initiating the test. In one embodiment, a task scheduler 915 initiates a test according to a received test time. The specified test time may be an immediate time, a time in the future, or a recurrence interval upon which the test time is to recur after the scheduled time. For example, a GUI such as GUI 1000 allows a user to specify whether a test will be performed immediately, sometime in the future, or at a recurring time (e.g., every ten minutes, two hours, daily, weekly, monthly, etc.).

In various embodiments, specified information regarding the conduct of a test which is received via the GUI may include a selection of a single computing environment within which a test is to be performed on a software item or a selection of a plurality of computing environments within which a test is to be performed on a software item. The specified information may include one or more specified electronic notification locations (e.g., one or more of an electronic mail address/addresses, a social network, a wiki, a flat file, a spread sheet, a network storage location, etc.) to which testing results for the scheduled test are to be sent.

At procedure 1130 of flow diagram 1100, in one embodiment, the test is initiated at the test time that was received via the graphical user interface. For example, a test is initiated by a task scheduler 915 at a time indicated by the specified time received. In an embodiment, this ensures that the operational status of an environment under test is checked. It should be appreciated that an environment under test may be a test environment or a live production environment.

At procedure 1140 of flow diagram 1100, in one embodiment the method as described in procedures 1110-1130, further includes sending results of the test to one or more specified electronic notification locations (e.g., one or more of an electronic mail address/addresses, a social network, a wiki, a flat file, a spread sheet, a network storage location, etc.) in response to completion of the test. In an embodiment, a testing log 477 (see, e.g., FIGS. 4G-4I) or portion thereof (e.g., a derivation of a log 477 such as a summary), may be sent to the specified electronic notification location(s). In some embodiments, the method described in procedures 1110-1130 can further send multiple messages/results to at least one specified electronic notification location.

At procedure 1150 of flow diagram 1100, in one embodiment the method as described in procedures 1110-1130, further includes sending a report of an error condition (if an error condition occurs during testing) to one or more specified electronic notification locations (e.g., one or more of an electronic mail address/addresses, a social network, a wiki, a flat file, a spread sheet, a network storage location, etc.) in response to an error condition occurring during the test. For example, in an embodiment, a screen shot, such as screen shot 490, of the error condition (if an error condition occurs) is sent to the specified electronic notification locations.

At procedure 1160 of flow diagram 1100, in one embodiment, the method as described in procedure 1150, further includes maintaining the test in an active state without terminating the test in response to the occurrence of an error condition. For example when an error occurs, a test may be paused while an email is sent and may stay paused for a pre-specified period of time to permit a user time to access the test for purposes of altering and continuing the test, or debugging the environment in the state of the error condition. As discussed above, maintaining a test in an active state may comprise storing various register values, prior testing information, data, etc., such that a test may be resumed.

FIG. 12 is a flow diagram 1200 of a method of software item testing, in accordance with various embodiments.

At procedure 1210 of flow diagram 1200, in one embodiment, an automated test of a software item is initiated at a prescheduled time. As discussed above, in an embodiment, a test may be initiated by a task scheduler 915 such as Microsoft™ Task Scheduler. GUI 1000 represents a non-limiting example of a GUI which may be presented by a user interface generator 211 and utilized to receive user input to task scheduler 915. In some embodiments, in addition to being scheduled for initiation at a particular time, an automated test may be scheduled to be initiated on a recurring basis after the prescheduled time.

In some embodiments, an automated test may be initiated in accordance with direction from a task scheduler 915. In an embodiment, for example, task scheduler 915 initiates an automated test of a software item within a preselected computing environment at a preselected time. The preselected test time may include, but is not limited to: when a specific system event occurs, at a user specified time/date, at a user specified time/date and on a user selected recurring interval, when a machine (or machines) enters an idle state, when a system is booted, when a user logs on, when a Terminal Server session changes state, etc.

At procedure 1220 of flow diagram 1200, in one embodiment, the test is paused within a computing environment in which the test is being conducted in response to occurrence of an error condition during the test. By pausing the test in response to occurrence of an error condition during the test, certain actions may be performed before the test is resumed. For instance, while a test is paused, in response to an error condition during a test, a report of the error condition may be sent to a specified electronic notification location or locations (e.g., one or more of an electronic mail address/addresses, a social network, a wiki, a flat file, a spread sheet, a network storage location, etc.). In one example, all prior testing information is maintained up to the occurrence of the error condition. In one embodiment, a test is maintained in an active state within a computing environment 910A, 910B, 220 in which the test is running. Pausing the test may facilitate a user altering a portion of the test and resuming the test using the altered version of the test.

At procedure 1230 of flow diagram 1200, in one embodiment, results of the test are sent to a specified electronic notification location or locations (e.g., one or more of: an electronic mail address/addresses, a social network, a wiki, a flat file, a spread sheet, a network storage location, etc.) in response to completion of the test. For example, a screen shot 490, a log 477 (or portion thereof), or other information may be sent to an electronic mail address after a test completes, or is terminated. In various embodiments, results of the test include summaries of actions performed or modification to tests made during the running of a test, and such summaries may be sent to an electronic notification location as part of a log 477 or independent of a log 477.

Capturing Test Data Associated with Error Conditions in Software Item Testing In various embodiments described herein when an error condition, such as error 476, occurs during a test of a software item, one or more of a variety of actions can automatically be taken in order to capture test data that is associated with the error condition. The nature of action(s) and the nature of the test data to be captured may vary, in some embodiments, based on the particulars of the actual software item under test.

As has been previously described with respect to FIGS. 4G-4J, a chronological log 477 is maintained of testing actions performed during a test of a software item 213. In some embodiments, when an error 476 occurs during a test of a software item 213, log 477 is annotated (see e.g., annotation 483 in FIGS. 4G and 4H) in a manner which describes the error which has occurred. It is appreciated that this annotation appears in the chronological order of where the error occurred during the testing.

In some embodiments, as illustrated in FIG. 4I, test summary information 484 (which may include a variety of statistics about the test) may be included in log 477, or in some embodiments, may be generated separately of log 477. For example, FIG. 4I shows a result summary 484 that may comprise information including, but not limited to: the type of machine that the test was run on, test duration, the start and stop times of the test, the number of test suites (e.g., test cases 315) run, the number of test suites that were successful, failed, and/or did not run, the number of actions performed (e.g., did not fail and did not contain any validation), the number of actions that passed (e.g., contained validation), the number of actions that were fixed, the number of actions that failed, etc.

In some embodiments, as has been previously described, a screen shot may be captured of an execution state of software item 213 upon the occurrence of the error condition while a test (e.g., a test 315) is being run on a software item under test 213. It is appreciated that the test may be paused while the screen shot is captured. Screen shot 490 of FIG. 4J, illustrates one non-limiting example of such a screen shot. Screen shots such as screen shot 490 are automatically captured when a software item under test 213 lends itself to documenting an error condition through such a screen shot capture. That is, screen shot capture is associated with errors that occur during the testing of GUI applications in a graphical operating system such as Microsoft's Windows operating system, or Web applications that operate through a Web browser such as Google Chrome, Mozilla Firefox, Microsoft Internet Explorer, Apple Safari, Opera and the like. Such screen shots can facilitate error analysis with respect to a test. At the same time, a log from the software item under test may be captured, or at least a snap shot of it may be captured, at the time of occurrence of the error condition.

Similarly, when a test case 315 is being run against a software item under test 213 which does not lend itself to screen shot capture (i.e., the software item or portion of the software item under test does not involve a user interface), a software item log file from the operation of the software item may be captured, or at least a snap shot of the software item log file may be captured, at the time of occurrence of the error.

In some embodiments, a hyperlink may be embedded in a test file at the point of occurrence of or associated with an error in the chronological listing of the actions performed and logged during a test of a software item. The hyperlink may be a link to additional captured data regarding the error condition such as, but not limited to, a screen shot of a GUI, a snap shot of a software item log, or a combination of a screen shot with log files.

The following discussion sets forth in detail the operation of some example methods of operation of embodiments. With reference to FIGS. 13, 14, and 15, flow diagrams 1300, 1400, and 1500 illustrate example procedures used by various embodiments. Flow diagrams 1300, 1400, and 1500 include some procedures that, in various embodiments, are carried out by a processor under the control of computer-readable and computer-executable instructions. In this fashion, procedures described herein and in conjunction with flow diagrams 1300, 1400, and 1500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (210A, 210B, 220, 910A, 910B). The computer-readable and computer-executable instructions, which reside on tangible computer readable storage media, are used to control or operate in conjunction with, for example, one or some combination of processors of the computing environment (210A, 210B, 220, 910A, 910B). It is appreciated that the processor(s) may be physical or virtual or some combination thereof (it should also be appreciated that a virtual processor is implemented on physical hardware). Although specific procedures are disclosed in flow diagrams 1300, 1400, and 1500, such procedures are examples. That is, embodiments are well suited to performing various other procedures or variations of the procedures recited in flow diagrams 1300, 1400, and 1500. Likewise, in some embodiments, the procedures in flow diagrams 1300, 1400, and 1500 may be performed in an order different than presented and/or not all of the procedures described in one or more of these flow diagrams may be performed. It is further appreciated that procedures described in flow diagrams 1300, 1400, and 1500 may be implemented in hardware, or a combination of hardware with firmware and/or software. In some embodiments, one or more of the procedures described in flow diagrams 1300, 1400, and 1500 may be implemented in response to payment of a fee and/or implemented within or via a cloud-based computing environment in response to payment of a fee and/or as part of a fee based service.

FIG. 13 is a flow diagram 1300 of a method of software item testing, in accordance with various embodiments.

At procedure 1310 of flow diagram 1300, in one embodiment, an automated test of a software item 213 is conducted. This can be any of the tests previously discussed and described herein, such as a test case 315, for example. The automated test of the software item may be conducted utilizing a computing environment such as any of computing environments 210A, 210B, 220, 910A, 910B or the like, and may utilize a real or virtual machine as a device under test.

At procedure 1320 of flow diagram 1300, in one embodiment, test data associated with an error condition is captured in response to an occurrence of the error condition during a test. As previously described, the test data associated with the error condition may comprise a capture of one or more of: a test log of actions performed during the test (which may be annotated with a description of the error condition), a summary of statistics regarding the test (which may be included as a part of the test log), a screen shot of an execution state of the software item upon occurrence of the error condition (e.g., a screen shot of a GUI, such as screen shot 490), a device under test log file (or snap shot thereof) reflective of the time of occurrence of the error condition, a software item log file from the software item under test (or snap shot thereof) reflective of the time of occurrence of the error condition. In the case of a test log of actions performed during the test, the test log (e.g., log 477) may or may not be annotated with a description of the error condition (e.g., an annotation in the manner of annotation 483). Additionally, or alternatively, the test log (e.g., log 477) may include a hyperlink (e.g., hyperlink 481) that provides a link from a point in the test log associated with the error condition to additional captured data regarding the error condition. Some non-limiting examples of additional information which may be assessed via such a hyperlink include, but are not limited to: a screen shot of a GUI at the time of the error condition, a software item log file (or snap shot thereof) at the time of occurrence of the error condition, or a combination of a screen shot with log files.

At procedure 1330 of flow diagram 1300, in one embodiment, a portion of the captured test data is forwarded to one or more designated electronic notification locations. Such electronic notification location(s) may be input, and thus designated, by a user via a user interface such as user interface 1000, or other user interface 212 provided by a computing environment (210A, 201B, 910A, 910B). Some non-limiting examples of electronic notification locations that all or some portion of the captured test data may be forwarded to include, but are not limited to, one or more of: an electronic mail address/addresses, a social network, a wiki, a flat file, a spread sheet, and a network storage location.

FIG. 14 is a flow diagram 1400 of a method of software item testing, in accordance with various embodiments.

At procedure 1410 of flow diagram 1400, in one embodiment, an automated test of a software item 213 is conducted within a computing environment. This can be any of the tests previously discussed and described herein, such as a test case 315, for example. The automated test of the software item may be conducted utilizing or within a computing environment such as any of computing environments 210A, 210B, 220, 910A, 910B or the like, and may utilize a real or virtual machine as a device under test.

At procedure 1420 of flow diagram 1400, in one embodiment, responsive to occurrence of an error condition during the test, documentation of an execution state associated with the software item is automatically captured at a time of occurrence of the error condition. This documentation is automatically captured in response to an occurrence of the error condition during the test. This may comprise capture of one or more of: a screen shot of an execution state of the software item upon occurrence of the error condition (e.g., a screen shot of a GUI, such as screen shot 490), a device under test log file (or snap shot thereof) reflective of the time of occurrence of the error condition, a software item log file from the software item under test (or snap shot thereof) reflective of the time of occurrence of the error condition.

At procedure 1430 of flow diagram 1400, in one embodiment, the captured documentation of the execution state associated with the software item is automatically electronically forwarded to one or more designated electronic notification locations. Such electronic notification location(s) may be input, and thus designated, by a user via a user interface such as user interface 1000, or other user interface 212 provided by a computing environment (210A, 201B, 910A, 910B). Some non-limiting examples of electronic notification locations that all or some portion of the captured documentation of the execution state may be forwarded to include, but are not limited to, one or more of: an electronic mail address/addresses, a social network, a wiki, a flat file, a spread sheet, and a network storage location. The actual captured documentation may be forwarded, a hyperlink to the captured documentation of the execution state may be forwarded, or a hyperlink to the captured documentation of the execution state may be included in a document that is forwarded. In one embodiment, for example, a hyperlink (or multiple hyperlinks) to captured documentation may be embedded in a document, such as a log 477 of testing actions performed during the test, and the document may be electronically forwarded to one or more designated electronic notification locations. Hyperlink 481 in FIG. 4G is one example of such an embedded hyperlink.

FIG. 15 is a flow diagram 1500 of a method of software item testing, in accordance with various embodiments.

At procedure 1510 of flow diagram 1500, in one embodiment, an automated test of a software item 213 is conducted. This can be any of the tests previously discussed and described herein, such as a test case 315, for example. The automated test of the software item may be conducted utilizing or within a computing environment such as any of computing environments 210A, 210B, 220, 910A, 910B or the like, and may utilize a real or virtual machine as a device under test.

At procedure 1520 of flow diagram 1500, in one embodiment, an error condition occurs during the testing and, in response to the occurrence of the error condition, a plurality of procedures 1522, 1524, and 1526 are performed.

At procedure 1522 of flow diagram 1500, in one embodiment, a description of the error condition is automatically annotated into a test log of actions performed during the test. This annotation creates an annotated test log. With reference to FIG. 4G, log 477 includes annotation 483 and is an example of an annotated test log.

At procedure 1524 of flow diagram 1500, in one embodiment, documentation of an execution state associated with the software item is automatically captured at a time of occurrence of the error condition. This documentation is automatically captured in response to an occurrence of the error condition during the test and may comprise a capture of one or more of: a screen shot of an execution state of the software item upon occurrence of the error condition (e.g., a screen shot of a GUI, such as screen shot 490), a device under test log file (or snap shot thereof) reflective of the time of occurrence of the error condition, a software item log file from the software item under test (or snap shot thereof) reflective of the time of occurrence of the error condition.

At procedure 1526 of flow diagram 1500, in one embodiment, a hyperlink to the captured documentation is automatically embedded within the annotated test log. In one embodiment, for example, a hyperlink (or multiple hyperlinks) to captured documentation may be embedded in a document, such as a log 477 of testing actions performed during the test, and the document may be electronically forwarded to one or more designated electronic notification locations. Hyperlink 481 in FIG. 4G is one example of such an embedded hyperlink which electronically references captured documentation. Such a hyperlink allows an individual to easily and quickly access additional information about an error condition while reviewing a test log.

In one embodiment, the flow diagram as described in procedures 1510 and 1520 further includes automatically electronically forwarding the annotated test log to one or more designated electronic notification locations. Such electronic notification location(s) may be input, and thus designated, by a user via a user interface such as user interface 1000, or other user interface 212 provided by a computing environment (210A, 201B, 910A, 910B). Some non-limiting examples of electronic notification locations that the annotated test log may be forwarded to include, but are not limited to, one or more of: an electronic mail address/addresses, a social network, a wiki, a flat file, a spread sheet, and a network storage location.

Software Development Kit Testing

Typically, specialized knowledge and expertise is required to properly test a software development kit (SDK). Testing an SDK typically involves developing a basic application to invoke the exposed methods of the SDK, and expose callback methods from the SDK. Conventionally, each time a developer needs to test a different aspect of the SDK, a code change and re-compile of the test application is required. Embodiments described herein eliminate the requirement for such re-compiling and allow for creating tests using natural language rather than a programming language.

Figure 16:
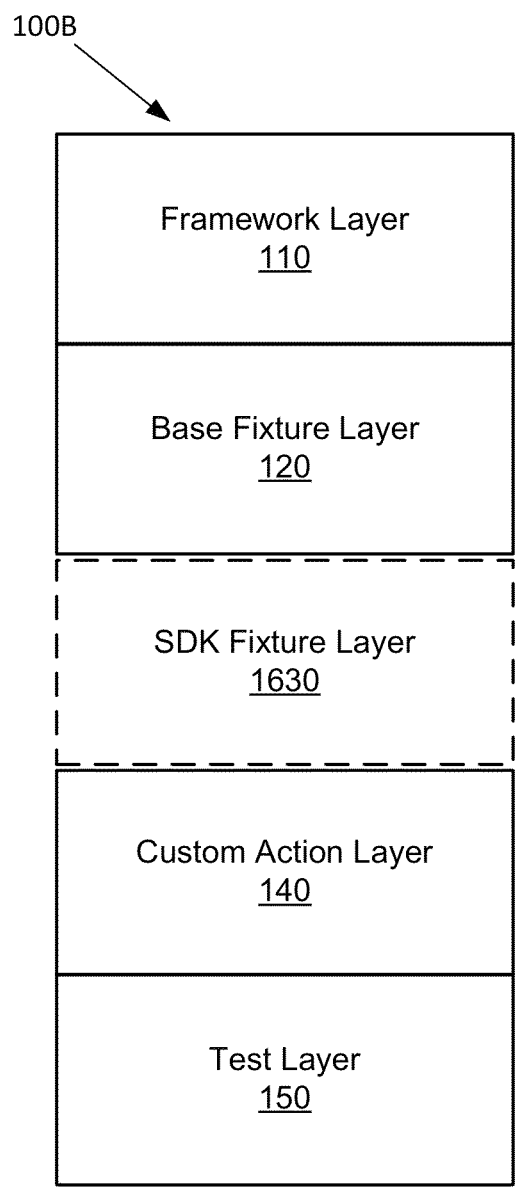
FIG. 16 is a block diagram of an example testing framework 100B, according to various embodiments.

FIG. 16 is a block diagram of an example testing framework 100B, according to various embodiments. Testing framework 100B is similar to testing framework 100 except that product fixture layer 130 has been replaced with SDK fixture layer 1630. In one embodiment, using testing framework 100B, SDK fixture layer 1630 comprises an action for each entry point into an SDK under test. In an embodiment, each entry point is invoked by providing the specific parameters an entry point requires. As a user writes a test using testing framework 100B, they are actually writing an application. For example, an application may be created when an SDK test is run. In various examples, that application may consume/exercise/utilize the SDK. In various embodiments, an application is thus consuming/exercising/utilizing the SDK in a manner similar to that of a typical Original Equipment Manufacturer's (OEM) application that uses the SDK. In some embodiments, each variation of a test effectively comprises a different application (equitable to an OEM application that uses the SDK), able to invoke any entry point in any sequence. In various embodiments, an output from the SDK is verified.

In various embodiments, both positive and negative tests may be validated. A negative test is a test where a failure is the expected output. For example, failures may be verified, and the handling of those failures may be verified. A positive test is a test where a success is the expected output. In some embodiments, a test comprises a combination of both positive and negative tests. In other embodiments, only a positive test or only a negative test is performed.

In some embodiments, a user may describe actions using an SDK application programming interface (API). In other words, using embodiments described herein, a test author can write test cases using an API manual. Thus, the natural language is bound to the API.

The following discussion sets forth in detail the operation of some example methods of operation of embodiments. With reference to FIG. 17, flow diagram 1700 illustrates example procedures used by various embodiments. Flow diagram 1700 includes some procedures that, in various embodiments, are carried out by a processor under the control of computer-readable and computer-executable instructions. In this fashion, procedures described herein and in conjunction with flow diagram 1700 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (210A, 210B, 910A, 910B, 220). The computer-readable and computer-executable instructions, which reside on tangible computer readable storage media, are used to control or operate in conjunction with, for example, one or some combination of processors of the computing environment (201A, 210B, 910A, 910B, 220). It is appreciated that the processor(s) may be physical or virtual or some combination thereof (it should also be appreciated that a virtual processor is implemented on physical hardware). Although specific procedures are disclosed in flow diagram 1700, such procedures are examples. That is, embodiments are well suited to performing various other procedures or variations of the procedures recited in flow diagram 1700. Likewise, in some embodiments, the procedures in flow diagram 1700 may be performed in an order different than presented and/or not all of the procedures described in one or more of these flow diagrams may be performed. It is further appreciated that procedures described in flow diagram 1700 may be implemented in hardware, or a combination of hardware with firmware and/or software. In some embodiments, one or more of the procedures described in flow diagram 1700 may be implemented in response to payment of a fee and/or implemented within or via a cloud-based computing environment in response to payment of a fee and/or as part of a fee-based service.

FIG. 17 is a flow diagram 1700 of a method of software development kit testing, in accordance with various embodiments.

At procedure 1710 of flow diagram 1700, in one embodiment, a graphical user interface is presented for initializing a test of an SDK. In an embodiment, graphical user interface generator 211, comprised within a task scheduling computing environment 910A or a task scheduling cloud-based computing environment 910B, provides a user interface 212 comprising test information and/or actions.

At procedure 1720 of flow diagram 1700, in one embodiment, an application is created to run against the SDK.

At procedure 1725 of flow diagram 1700, in one embodiment, natural language is bound to an application programming interface. For example, rather than learning a programming language to write code for testing the SDK, the same commonly used for writing test cases 315 may be used to write the tests for the SDK.

At procedure 1730 of flow diagram 1700, in one embodiment, an output of the SDK is verified. The output may be a positive or a negative output. For instance, a failure may be expected, and as such the test will verify a failure occurred. Moreover, a test may verify that the failure was handled correctly by an error handler.

At procedure 1740 of flow diagram 1700, in one embodiment, when included, each entry point into an SDK is invoked. For example, an application may be written to invoke each entry point into an SDK.

At procedure 1760 of flow diagram 1700, in one embodiment, when included, interactions are tested with the SDK. As discussed herein, positive and negative interactions may be tested with an SDK. In some embodiments, the output of an SDK is expected to be positive. In other embodiments, the output of an SDK is expected to be negative. Moreover, in some embodiments an error handler is expected to operate in a particular manner. In various embodiments the SDK test is operable to verify that an error handler performed correctly.

At procedure 1770 of flow diagram 1700, in one embodiment, when included, callbacks from the SDK back to entry points in an application are tested. In one embodiment, parameter values generated by the SDK passed to the callbacks are tested. In one embodiment, when included, a sequence of callbacks that an SDK makes to the application are tested. For example, a test may verify that event A occurs before event B, and that event B occurs before event C. In one embodiment, testing that the SDK does not make particular callbacks to the application is performed. For example, a test may determine whether or not a particular event occurred. In one embodiment, testing a set of callbacks from the SDK to the application without regard to a sequence is performed. For example, event A may have occurred five times, event B may have occurred four times, event C may have occurred zero times, and any number of any other events may have occurred.

Test Environment Managed within Tests

In some embodiments described herein, test frameworks (100, 100B) manage test cases 315, test execution, and test infrastructure. In other embodiments discussed herein, a test framework 100C (FIG. 18) is utilized in which tests themselves are responsible for managing the test environment they will be executing the test against. For example, when test collateral exists in a plurality of target computing environment virtual machines (e.g., two, dozens, hundreds, or thousands of virtual machines), managing the test environment within the plurality of virtual machines allows one or more test cases 315 to run within the same test environment across the dozen of machines. In various embodiments, this includes reverting virtual machine snapshots, and/or starting and stopping virtual machines. In some embodiments, a test does not know beforehand, the specific details of the testing environment it will be running in. Thus, in some examples providing a test environment (e.g., test environment 1920 of FIGS. 19A and 19B) a test is allowed to run in a predetermined testing environment.

When managing a testing environment, certain modifications may be implemented which are not in test cases 315, as described elsewhere herein. For instance, modification may exist with respect to test a particular environment that may need to be stopped and then restarted. In some embodiments, snap shots are taken of a virtual environment and sent back to a test. In various embodiments, commands and/or actions for altering a testing environment are written in the same commonly used language as custom actions 320 and/or as test cases 315

Figure 18:
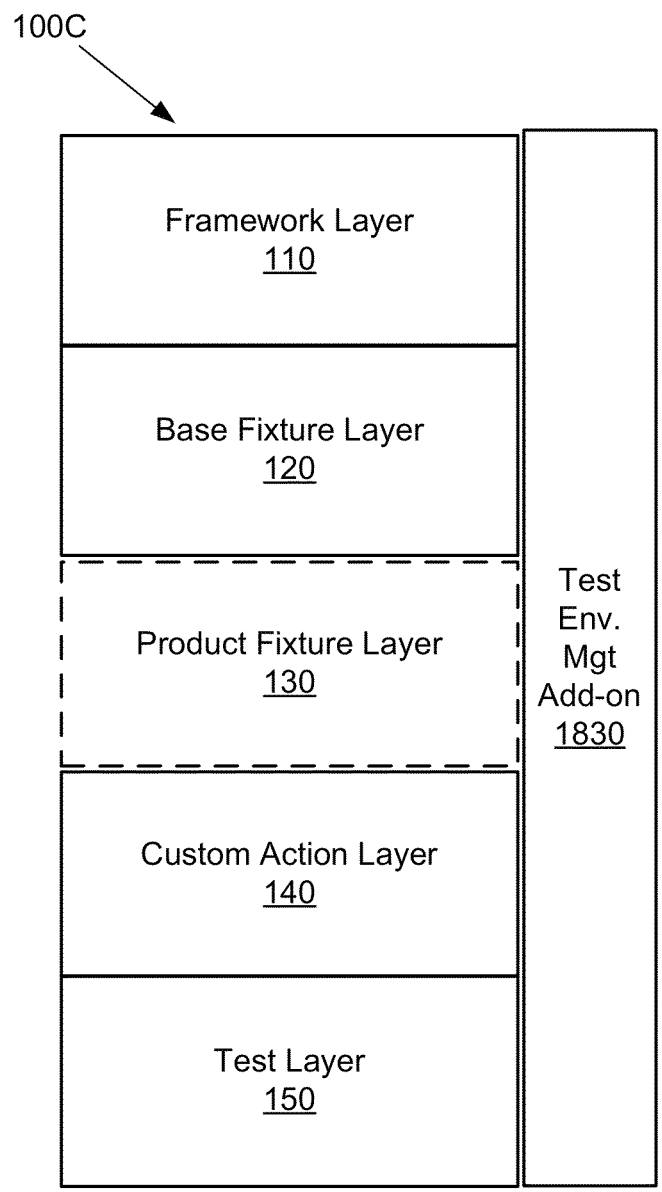
FIG. 18 shows an example test framework comprising a test environment management layer.

FIG. 18 shows an example test framework 100C comprising a test environment management add-on 1830. Test framework 100C is similar to testing framework 100 except that environment management add-on 1830 provides additional actions available to all layers. Similar to fixtures, add-ons are simply a collection of actions of a particular type, which are made available for use by all fixtures, including base fixtures and product fixtures. In an embodiment, test environment management add-on 1830 is operable to modify the testing environment 1920 it is responsible for testing.

For tests to run against any test environment 1920, in one embodiment, the use of at least one global variable file 1930 that describes the test environment 1920 is utilized. Tests may use generic references to machine names, which are defined in a global variable file 1930 (e.g., an environment file). If a portion of underlying infrastructure is changed (e.g., a global variable file 1930), the change impacts every test that utilizes that portion of underlying infrastructure.

In one embodiment, a test is vendor agnostic. In other words, a test framework 100C that is capable of modifying test environments 1920 may operate on any type of machine, operating system, API, application, etc. In other embodiments, a test framework 100C is designed to operate on a particular type of virtual machine, operating system, application, etc.

In one embodiment, a graphical user interface (GUI) is presented to initialize a test. In one embodiment, the same (or another) GUI is presented for the entry of parameters for a test environment 1920. For example, a GUI may be presented such that a user can enter a command to shut off, revert, or start a particular virtual machine.

Figure 19A:
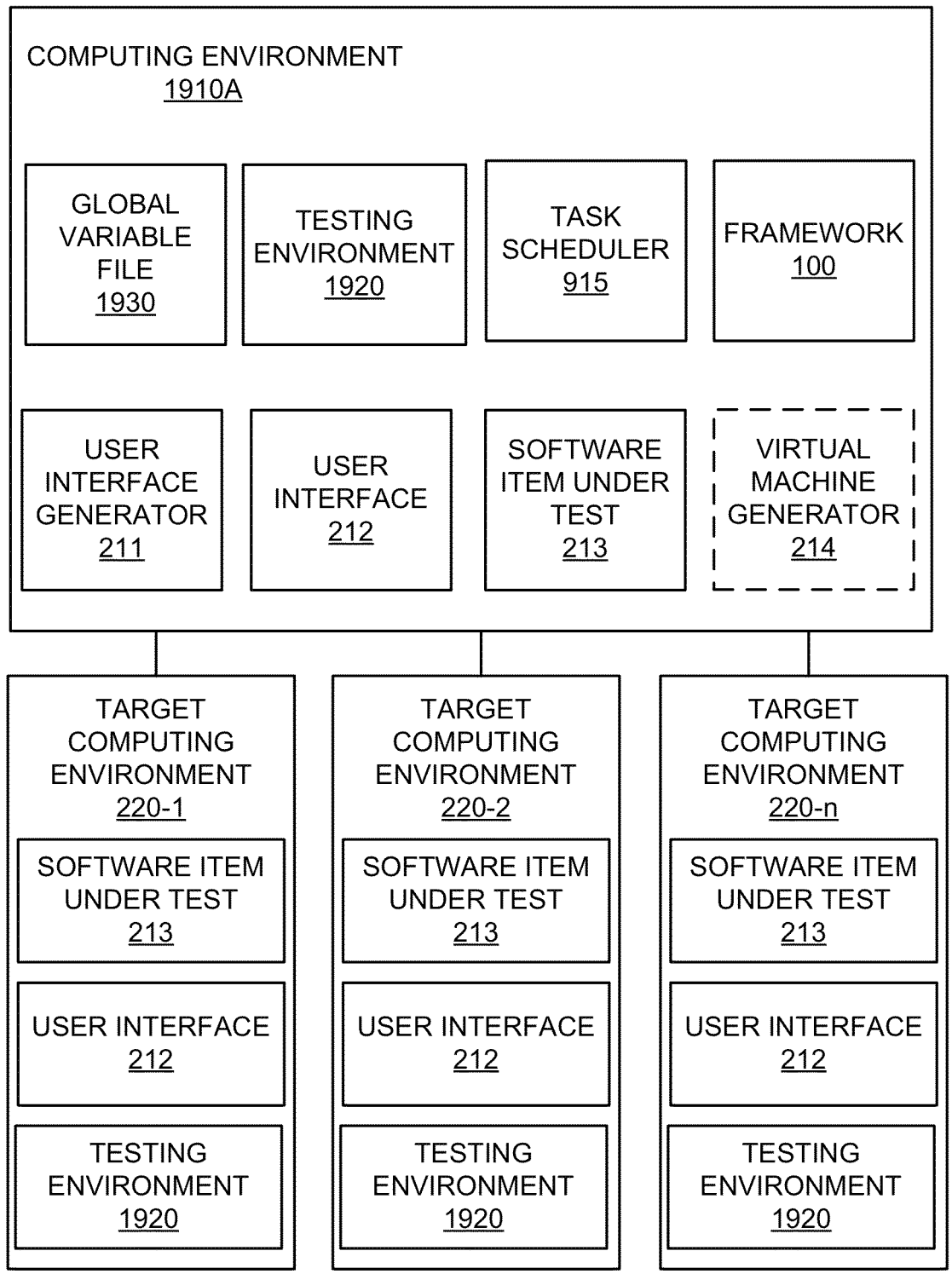
FIGS. 19A and 19B are block diagrams of some example computing environments with which or upon which embodiments may be implemented.
Figure 19B:
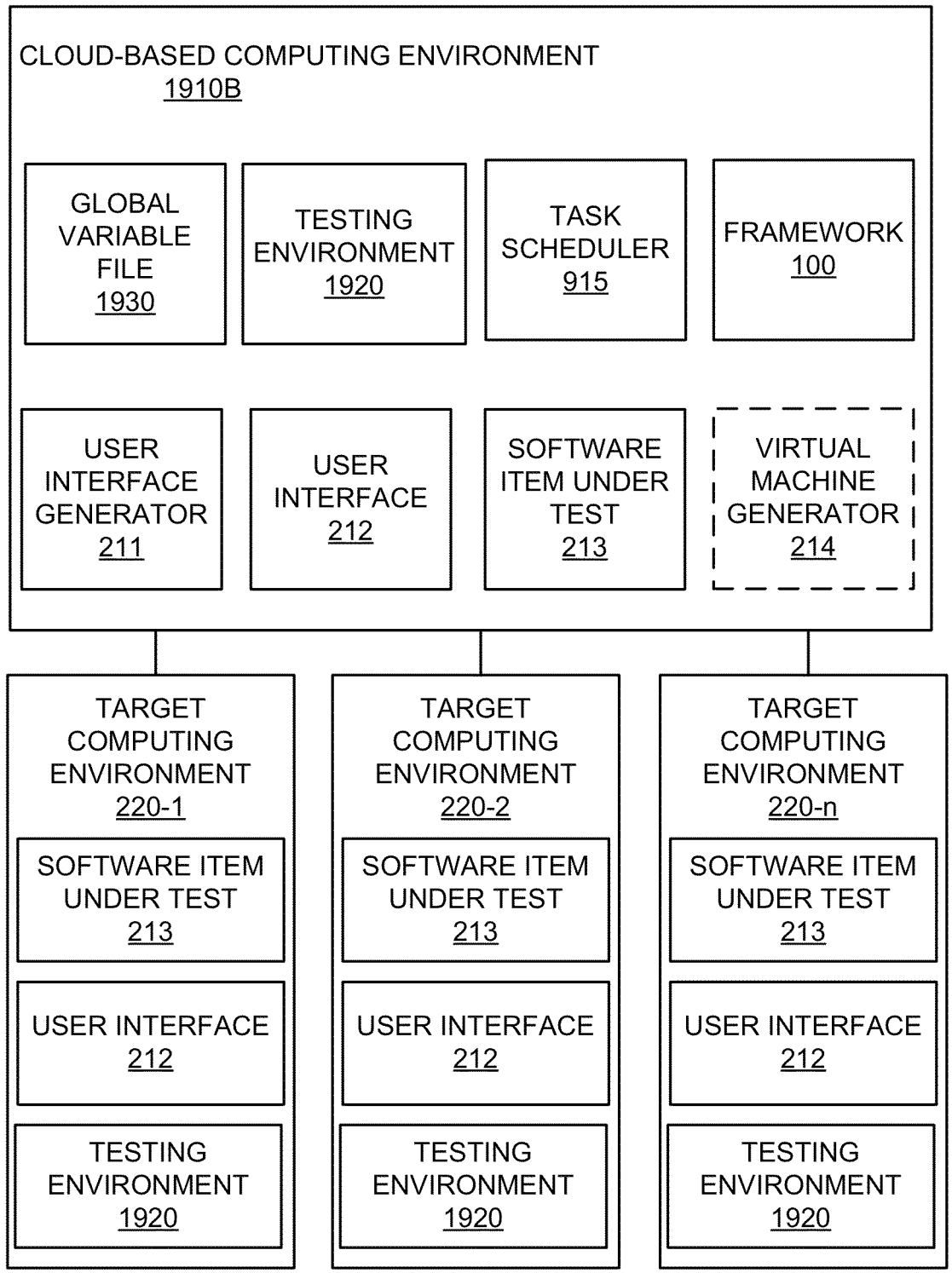

FIGS. 19A and 19B are block diagrams of example computing environments (1910A, 1910B) with which or upon which embodiments may be implemented.

FIG. 19A is similar to FIG. 9A, with the additions of testing environment 1920 and global variable file 1930, while FIG. 19B is similar to FIG. 9B, with the additions of testing environment 1920 and global variable file 1930.

In some embodiments, some or all of the actions and processes described herein, with respect to a test environment being managed within a test, are performed on a physical computing environment 1910A. In some embodiments, some or all of the actions and processes described herein, with respect to a test environment being managed within a test, are performed in a cloud-based environment such as cloud-based computing environment 1910B.

The following discussion sets forth in detail the operation of some example methods of operation of embodiments. With reference to FIG. 20, flow diagram 2000 illustrates example procedures used by various embodiments. Flow diagram 2000 includes some procedures that, in various embodiments, are carried out by a processor under the control of computer-readable and computer-executable instructions. In this fashion, procedures described herein and in conjunction with flow diagram 2000 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (210A, 201B, 910A, 910B, 1910A, 1910B, 220). The computer-readable and computer-executable instructions, which reside on tangible computer readable storage media, are used to control or operate in conjunction with, for example, one or some combination of processors of the computing environment (210A, 201B, 910A, 910B, 1910A, 1910B, 220). It is appreciated that the processor(s) may be physical or virtual or some combination thereof (it should also be appreciated that a virtual processor is implemented on physical hardware). Although specific procedures are disclosed in flow diagram 2000, such procedures are examples. That is, embodiments are well suited to performing various other procedures or variations of the procedures recited in flow diagram 2000. Likewise, in some embodiments, the procedures in flow diagram 2000 may be performed in an order different than presented and/or not all of the procedures described in one or more of these flow diagrams may be performed. It is further appreciated that procedures described in flow diagram 2000 may be implemented in hardware, or a combination of hardware with firmware and/or software. In some embodiments, one or more of the procedures described in flow diagram 2000 may be implemented in response to payment of a fee and/or implemented within or via a cloud-based computing environment in response to payment of a fee and/or as part of a fee based service.

FIG. 20 is a flow diagram 2000 of a method of managing a test environment, in accordance with various embodiments.

At procedure 2010 of flow diagram 2000, in one embodiment, a test is initialized. This can comprise presentation of a GUI via which the test is may be initialized. In an embodiment, the initialized test manages the test environment 1920 that the test executes test cases 315 against during run time. In one embodiment, a test is performed on a physical computing environment 1910A; while in another embodiment a test is performed in a cloud-based computing environment 1910B. In some cases, a test may be performed on both a physical computing environment 1910A and a cloud-based computing environment 1910B.

In one embodiment, the test modifies a test environment 1920 such that the test begins in a predetermined test environment 1920. For example, if a test requires a virtual machine to be shut off, the test will modify test environment 1920 such that the virtual machine is shut off. If a test requires a virtual machine to be powered on at a specific snapshot, the test will modify test environment 1920 such that the virtual machine is reverted to the specific snapshot and powered on. If a test requires a plurality of virtual machines in various operational states, the test will modify test environment 1920 such that the plurality of virtual machines be in their required initialized state.

In one embodiment the test which manages test environment 1920 is written in the same commonly used language as a test that does not manage a test environment 1920

At procedure 2020 of flow diagram 2000, in one embodiment, at least one global variable file is accessed by the test. In an embodiment, a global variable file 1930 describes test environment 1920. It should be appreciated that in a cloud-based computing environment 1910B, a test can dynamically acquire, create and/or provision the required systems and likewise dynamically dispose of the systems upon test completion. It should also be made clear that there is no direct dependency or binding to any specific instance of a system required to perform a test. A global variable adds a layer of abstraction, wherein a user may use a generic reference to a machine, or plurality of machines, and global variable file 1930 will assist in translating the machine references into specific machines available in the test environment 1920.

At procedure 2030 of flow diagram 2000, in one embodiment, when included, virtual machine snapshots are reverted. In an embodiment, snapshots of a virtual machine are reverted such that the test may guarantee the virtual machines are in a known state. In an embodiment, the virtual machine may be a target computing environment such as target computing environment 220-1 of FIGS. 19A and 19B.

At procedure 2040 of flow diagram 2000, in one embodiment, when included, at least one virtual machine is started. For example, managing a testing environment 1920 may include tests that require at least one virtual machine (e.g., 1910A, 1910B, 220) to be starting up and/or recently started in order to perform a test.

At procedure 2050 of flow diagram 2000, in one embodiment, when included, at least one virtual machine is stopped. For example, managing a testing environment 1920 may include tests that require at least one virtual machine (e.g., 1910A, 1910B, 220) to be stopped in order to perform a test.

Test Creation with Execution

In various embodiments, framework 100 comprises a test editor (e.g., custom testing action GUI 410, custom action editor 440, etc.) that performs real time validation and execution of a test while the test is being written.

With references again to FIGS. 4A-4F, in some embodiments, as a user enters custom actions 320 into a line 425 in a test editor, the lines 425 are continuously being verified for syntax errors 450 and completeness. In other words, after a portion of a parameter 426 is entered into a test (e.g., test case 315), that portion of a parameter 426 is tested for syntax errors 450 and completeness. If a syntax error 450 is found, an indication is provided such as an exclamation point as shown in FIG. 4E. In some embodiments, syntax verification and test execution are performed upon the entry of an action 421.

In one embodiment, once a line 425 is entered (i.e., complete) and free from syntax errors 450, a user may execute that line 425 (e.g., execute that custom action 320) via the test editor to verify the intended logic. In some embodiments, execution is performed automatically after a line 425 is found to be free from syntax errors 450. A user may execute multiple lines 425 to verify the intended logic for each line 425 in a test. In one example, a test will indicate whether it will execute successfully and is free from syntax errors 450 and logic errors, thus reducing test creation time. It should be appreciated that, via the test editor a user may select any line 425 or combination of lines 425 for execution at any time, without restriction.

In one embodiment, when every line 425 of a test is executed in order to verify logic, the entire test is run. In other words, in addition to each line 425 being verified by execution, each action 421 is also performed when executed. For example, FIG. 4C shows a custom action editor 440. In the first row, the action 421 "WaitWindowExit" has been verified and executed. When verifying whether action 421 "Click" performs the correct action, it is also executed (i.e., run). As another example, FIG. 4C shows a plurality of lines 425. If the lines 425 comprise an entire test, by verifying each line 425 in order, the entire test has been run. In one embodiment, an indication of a completed test is presented if a test is complete after every line 425 is entered and verified (i.e., executed).

The following discussion sets forth in detail the operation of some example methods of operation of embodiments. With reference to FIG. 21, flow diagram 2100 illustrates example procedures used by various embodiments. Flow diagram 2100 includes some procedures that, in various embodiments, are carried out by a processor under the control of computer-readable and computer-executable instructions. In this fashion, procedures described herein and in conjunction with flow diagram 2100 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (910A, 910B, 1910A, 1910B, 220). The computer-readable and computer-executable instructions, which reside on tangible computer readable storage media, are used to control or operate in conjunction with, for example, one or some combination of processors of the computing environment (910A, 910B, 1910A, 1910B, 220). It is appreciated that the processor(s) may be physical or virtual or some combination thereof (it should also be appreciated that a virtual processor is implemented on physical hardware). Although specific procedures are disclosed in flow diagram 2100, such procedures are examples. That is, embodiments are well suited to performing various other procedures or variations of the procedures recited in flow diagram 2100. Likewise, in some embodiments, the procedures in flow diagram 2100 may be performed in an order different than presented and/or not all of the procedures described in one or more of these flow diagrams may be performed. It is further appreciated that procedures described in flow diagram 2100 may be implemented in hardware, or a combination of hardware with firmware and/or software. In some embodiments, one or more of the procedures described in flow diagram 2100 may be implemented in response to payment of a fee and/or implemented within or via a cloud-based computing environment in response to payment of a fee and/or as part of a fee based service.

FIG. 21 is a flow diagram 2100 of a method of executing a test while creating the test, in accordance with various embodiments.

At procedure 2110 of flow diagram 2100, in one embodiment, a portion of a line 425 of a test case 315 for a software item is received.

At procedure 2120 of flow diagram 2100, in one embodiment, syntax is validated upon entry of a portion of a line 425. In one embodiment, the parameters 426 entered into line 425 are tested for syntax errors 450 upon the entry of each character. In one embodiment, an indication of an error based on syntax 450 is presented prior to execution of said line 425 in said test case 315.

At procedure 2130 of flow diagram 2100, in one embodiment, a line 425 is executed after the syntax of that line is validated. For example, upon entry of a custom action 320, the custom action is executed/run. In an embodiment, a line 425/custom action 320 is executed automatically after the line 425/custom action 320 passes a test for syntax errors 450. In another embodiment, a line 425 is executed after a user chooses to execute the line 425.

At procedure 2140 of flow diagram 2100, in one embodiment, any error based on execution is indicated. This can include, but is not limited to, indicating an error based on syntax. For example, in some embodiments, an exclamation point or an error symbol is presented upon determining the presence of a syntax error 450.

At procedure 2150 of flow diagram 2100, in one embodiment, when included, any error that occurs while executing a line 425 is indicated. For example, if a line 425 references a GUI that is not available upon execution of that line, an indication that the GUI is not available (e.g., 483 of FIGS. 4G and 4H) is presented.

Test Language Interpreter

Figure 22:
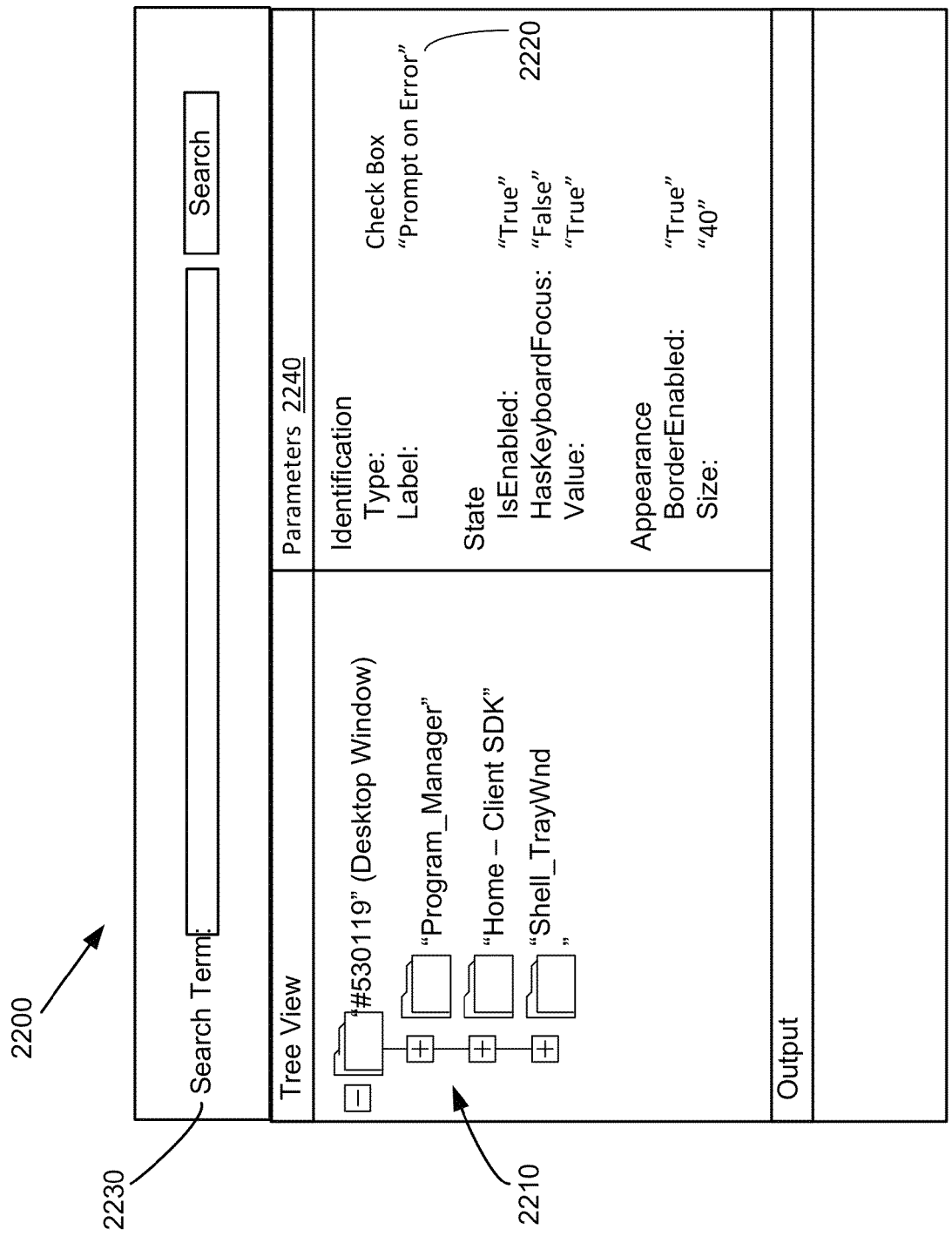
FIG. 22 illustrates an example language evaluator, in accordance with various embodiments.

Typically, conventional user interface automation is difficult to write and costly to maintain. However, embodiments of framework 100 discussed herein provide for user interface changes, including, but not limited to: moving elements, renaming elements, changing text, etc. In an embodiment, a language evaluator interprets an entry, and then performs user interface tree 2210 (FIG. 22) searches by combining a plurality of user interface properties for an intuitive user automation experience. Moreover, in an embodiment, debugging a user interface 212 does not need to be performed before a search.

A language evaluator 2200 may identify a control (e.g., an edit control) by using the name of the label control adjacent to the edit control, and perform multi-step user interface tree 2010 searches for controls buried inside of panes, by referencing the appearance of the control instead of the unique identification of the control.

In an embodiment, a user may enter plain English search term 2230 into language evaluator 2200. Using plain English term, 2230, a linkage is built at run time to a control 2220. This way, a user does not need to know the underlying structure of an application. A user may access a control 2220 of an application simply by describing a control 2220.

In an embodiment, language evaluator 2200 combines parameters 2240 to pin a control in the software item under test 213. Parameters include, but are not limited to: type, label, appearance, size, associated text, location on screen, etc. In one example, a tree 2210 of controls is searched for controls 2220 using a combination of parameters. In other words, language evaluator 2200 can find a control 2220 based on a description of the appearance of that control 2220.

In one embodiment, a tree 2210 is searched for a control 2220 in a user interface 212 in real time. For example, a test may click on "menu," then "file," then "new," then finally "machine group." Typically, coding this action would require knowledge of performing tree 2210 searches. In an embodiment, by entering plain English words, the tree 2210 is searched. In this example, language evaluator will search tree 2210 and find "machine group" within "new," which is within "file," which is within "menu."

The following discussion sets forth in detail the operation of some example methods of operation of embodiments. With reference to FIG. 23, flow diagram 2300 illustrates example procedures used by various embodiments. Flow diagram 2300 includes some procedures that, in various embodiments, are carried out by a processor under the control of computer-readable and computer-executable instructions. In this fashion, procedures described herein and in conjunction with flow diagram 2300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, any or all of which may be employed with a computing environment (210A, 210B, 910A, 910B, 1910A, 1910B, 220). The computer-readable and computer-executable instructions, which reside on tangible computer readable storage media, are used to control or operate in conjunction with, for example, one or some combination of processors of the computing environment (210A, 210B, 910A, 910B, 1910A, 1910B, 220). It is appreciated that the processor(s) may be physical or virtual or some combination thereof (it should also be appreciated that a virtual processor is implemented on physical hardware). Although specific procedures are disclosed in flow diagram 2300, such procedures are examples. That is, embodiments are well suited to performing various other procedures or variations of the procedures recited in flow diagram 2300. Likewise, in some embodiments, the procedures in flow diagram 2300 may be performed in an order different than presented and/or not all of the procedures described in one or more of these flow diagrams may be performed. It is further appreciated that procedures described in flow diagram 2300 may be implemented in hardware, or a combination of hardware with firmware and/or software. In some embodiments, one or more of the procedures described in flow diagram 2000 may be implemented in response to payment of a fee and/or implemented within or via a cloud-based computing environment in response to payment of a fee and/or as part of a fee based service.

FIG. 23 is a flow diagram 2300 of a method of binding a software item to a plain English name, in accordance with various embodiments.

At procedure 2310 of flow diagram 2300, in one embodiment, a user input of a plain English control name is received into a test file. In some embodiments, a user input is entered into a search bar. In other embodiments, a user input may comprise a selection from a list.

At procedure 2320 of flow diagram 2300, in one embodiment, a user interface under test is automatically searched for a control corresponding to the plain English control name. In one embodiment, searching a user interface 212 comprises traversing a tree 2210 of controls. In one embodiment, searching a user interface 212 comprises scanning parameters 2240 within trees 2210. For example, while scanning a tree 2210, parameters within an item in the tree 2210 may be scanned to determine whether the control 2220 has been found. In one embodiment, debugging does not need to be performed before a search. In some examples, a user interface 212 must be debugged before a control 2220 can be bound to a plain English name.

At procedure 2330 of flow diagram 2300, in one embodiment, a control in the software item under test is dynamically bound to the plain English control name. In one embodiment, binding a plain English control name to a software item under test comprises determining the location of a control 2220. In one example, searching and/or binding occur in real time.

CONCLUSION

Numerous embodiments have been described herein as examples, and many embodiments are also more fully described under distinct headings. Embodiments were presented in this manner for purposes of clarity, and such presentation is not meant to imply that embodiments described in isolation from other embodiments are not interoperable. To the contrary, it should be appreciated that the embodiments described herein may be combined in a variety of combinations with one another and that such combinations of the embodiments described herein are fully anticipated. Some non-limiting examples of such combinations of the embodiments and concepts describe herein include, but are not limited to: combining embodiments discussed in the Custom Actions section with embodiments discussed in the Scheduled Software Item Testing section; combining embodiments discussed in the Custom Editors section with embodiments discussed in the Altering a Test while a Test is in an Active State section, further combining with embodiments discussed in the Software Development Kit Testing section; etc.

Example embodiments of the subject matter are thus described. Although various embodiments have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A non-transitory computer readable storage medium comprising instructions stored thereon which, when executed, cause a computing system to perform a method of software development kit (SDK) testing, said method comprising:
presenting a graphical user interface for initializing a test of an SDK;
creating an application to run against said SDK;
verifying an output of said SDK;
testing callbacks from said SDK back to entry points in said application; and
testing a set of callbacks from said SDK to said application without regard to a sequence.

2. The non-transitory computer readable storage medium of claim 1, further comprising instructions for:
invoking each entry point into an SDK, wherein said invoking comprises providing all parameters that an entry point requires.

3. The non-transitory computer readable storage medium of claim 1, further comprising instructions for:
testing positive interactions with said SDK.

4. The non-transitory computer readable storage medium of claim 1, further comprising instructions for:
testing negative interactions with said SDK.

5. The non-transitory computer readable storage medium of claim 1, wherein testing callbacks further comprises:
testing parameter values generated by said SDK passed to said callbacks.

6. The non-transitory computer readable storage medium of claim 1, wherein testing callbacks further comprises:
testing said sequence of callbacks that said SDK makes to said application.

7. The non-transitory computer readable storage medium of claim 1, wherein testing callbacks further comprises:
testing that said SDK does not make particular callbacks to said application.

8. The non-transitory computer readable storage medium of claim 1, wherein said creating an application to run against said SDK comprises:
binding natural language to an application programming interface (API) intercept.

9. The non-transitory computer readable storage medium of claim 1, wherein said SDK comprises an action for every entry point into said SDK.

10. The non-transitory computer readable storage medium of claim 1, wherein said application to run against said SDK is similar to an original equipment manufacturer (OEM) application.

11. A method of software development kit (SDK) testing, said method comprising:
presenting a graphical user interface for initializing a test of an SDK;
creating an application to run against said SDK;
verifying an output of said SDK;
testing callbacks from said SDK back to entry points in said application; and
testing a set of callbacks from said SDK to said application without regard to a sequence.

12. The method as recited in claim 11, further comprising:
invoking each entry point into an SDK, wherein said invoking comprises providing all parameters that an entry point requires.

13. The method as recited in claim 11, further comprising:
testing negative interactions with said SDK.

14. The method as recited in claim 11, further comprising:
testing positive interactions with said SDK.

15. The method as recited in claim 11, wherein testing callbacks further comprises:
testing parameter values generated by said SDK passed to said callbacks.

16. The method as recited in claim 11, wherein testing callbacks further comprises:
testing said sequence of callbacks that said SDK makes to said application.

17. The method as recited in claim 11, wherein testing callbacks further comprises:
testing that said SDK does not make particular callbacks to said application.

18. The method as recited in claim 11, wherein said creating an application to run against said SDK comprises:
binding natural language to an application programming interface (API).

19. The method as recited in claim 11, wherein said SDK comprises an action for every entry point into said SDK.

20. The method as recited in claim 11, wherein said application to run against said SDK is similar to an original equipment manufacturer (OEM) application.

21. A software development kit (SDK) testing framework comprising:
- a computing environment;
- framework layer disposed in said computing environment and operable to perform a test on an SDK;
- a custom action layer disposed in said computing environment;
- at least one fixture layer disposed in said computing environment and operable to communicate with said framework layer and said custom action layer;
- a test layer disposed in said computing environment and configured to communicate with said custom action layer; and
- an SDK testing layer that is operable to create an application to run against said SDK;
- wherein said framework layer is operable to test callbacks from said SDK back to entry points in said application and test a set of callbacks from said SDK to said application without regard to a sequence.

22. The computing environment of claim 21, wherein said framework layer to perform a test on an SDK is operable to test for positive and negative interactions.

* * * * *